(12) United States Patent
Nakamura et al.

(10) Patent No.: US 8,348,164 B2
(45) Date of Patent: Jan. 8, 2013

(54) INFORMATION PROCESSING APPARATUS, INFORMATION PROCESSING METHOD, PROGRAM AND INFORMATION PROCESSING SYSTEM

(75) Inventors: Hiroshi Nakamura, Tokyo (JP); Shuichi Sekiya, Saitama (JP); Hiroyuki Nagasawa, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 319 days.

(21) Appl. No.: 12/633,432

(22) Filed: Dec. 8, 2009

(65) Prior Publication Data

US 2010/0140343 A1    Jun. 10, 2010

(30) Foreign Application Priority Data

Dec. 9, 2008   (JP) ................................ 2008-313471

(51) Int. Cl.
*G06K 7/10* (2006.01)
*G06K 7/14* (2006.01)
*G06F 17/00* (2006.01)

(52) U.S. Cl. ....................................... 235/454; 235/375
(58) Field of Classification Search .................. 235/375, 235/462.01, 462.1, 462.11, 462.45, 462.46, 235/472.01–472.03, 454; 219/714, 506
See application file for complete search history.

(56) References Cited

U.S. PATENT DOCUMENTS

| | | | | |
|---|---|---|---|---|
| 4,816,635 | A * | 3/1989 | Edamura ........................ | 219/714 |
| 4,841,132 | A * | 6/1989 | Kajitani et al. ........... | 235/462.46 |
| 7,387,250 | B2 * | 6/2008 | Muni ........................ | 235/462.01 |
| 2003/0135388 | A1 * | 7/2003 | Martucci et al. .................. | 705/2 |
| 2005/0011957 | A1 * | 1/2005 | Attia et al. ............... | 235/462.46 |
| 2006/0118632 | A1 * | 6/2006 | Joseph et al. .............. | 235/462.1 |
| 2006/0180659 | A1 * | 8/2006 | Loffredo et al. .............. | 235/380 |
| 2006/0289654 | A1 * | 12/2006 | Robinson et al. ........ | 235/462.46 |
| 2007/0102521 | A1 | 5/2007 | Petersson | |
| 2008/0013503 | A1 * | 1/2008 | Lee ............................... | 370/338 |

FOREIGN PATENT DOCUMENTS

| | | |
|---|---|---|
| JP | 2003-330831 | 11/2003 |
| JP | 2005-190231 | 7/2005 |
| JP | 2006-001063 | 1/2006 |
| JP | 2008-090594 | 4/2008 |
| JP | 2008-104155 | 5/2008 |
| JP | 2008-146478 | 6/2008 |

OTHER PUBLICATIONS

Japanese Office Action mailed Sep. 21, 2010 corresponding to Japanese Patent Appln. No. 2008-313471.
European Search Report mailed Nov. 24, 2010 corresponding to European Patent Appln. No. 09014998.0.

* cited by examiner

*Primary Examiner* — Michael G Lee
*Assistant Examiner* — Suezu Ellis
(74) *Attorney, Agent, or Firm* — K&L Gates LLP

(57) ABSTRACT

There is provided an information processing apparatus including a communication unit for transmitting a carrier wave having a predetermined frequency and making noncontact communication with an information processing terminal, a 2-dimensional code reader unit for reading a 2-dimensional code recording therein processing information on processings to be executed by the information processing terminal, a 2-dimensional code analysis unit for analyzing the 2-dimensional code reader in the 2-dimensional code reader unit and acquiring the processing information from the 2-dimensional code, and a processing unit for generating processing execution information for causing the information processing terminal to execute a predetermined processing based on an analysis result by the 2-dimensional code analysis unit and causing the communication unit to transmit the processing execution information to the information processing terminal.

9 Claims, 11 Drawing Sheets

FIG. 3

| BEHAVIOR TYPE | ACTIVATION INFORMATION | OPTION |
|---|---|---|
| BROWSER ACTIVATION | (URL) | (INFORMATION ADDED TO URL) |
| APPLICATION ACTIVATION | (APPLICATION NAME) | (INFORMATION HANDED TO APPLICATION) |
| MAILER ACTIVATION | (E-MAIL INFORMATION) | (ATTACHED INFORMATION AND OTHERS) |

FIG. 4

| I1 | I2 | I3 | I3 | I5 |
|---|---|---|---|---|
| BEHAVIOR TYPE | ACTIVATION INFORMATION | OPTION1 | OPTION2 | CONTROL INFORMATION |
| BROWSER ACTIVATION | (URL) | (INFORMATION ADDED TO URL) | (INFORMATION ADDED TO URL) | (ADD OPTION1 WHEN FIRST DEVICE SPECIFICATION INFORMATION MEETS CONDITION x AND OPTION2 IN OTHER CASE) ~ I5-1 |
| APPLICATION ACTIVATION | (APPLICATION NAME) | (INFORMATION HANDED TO APPLICATION) | (INFORMATION HANDED TO APPLICATION) | (ADD FIRST DEVICE SPECIFICATION INFORMATION AND SECOND DEVICE SPECIFICATION INFORMATION) ~ I5-2 |
| MAILER ACTIVATION | (E-MAIL INFORMATION) | (ATTACHED INFORMATION AND OTHERS) | | ~ I5-3 |

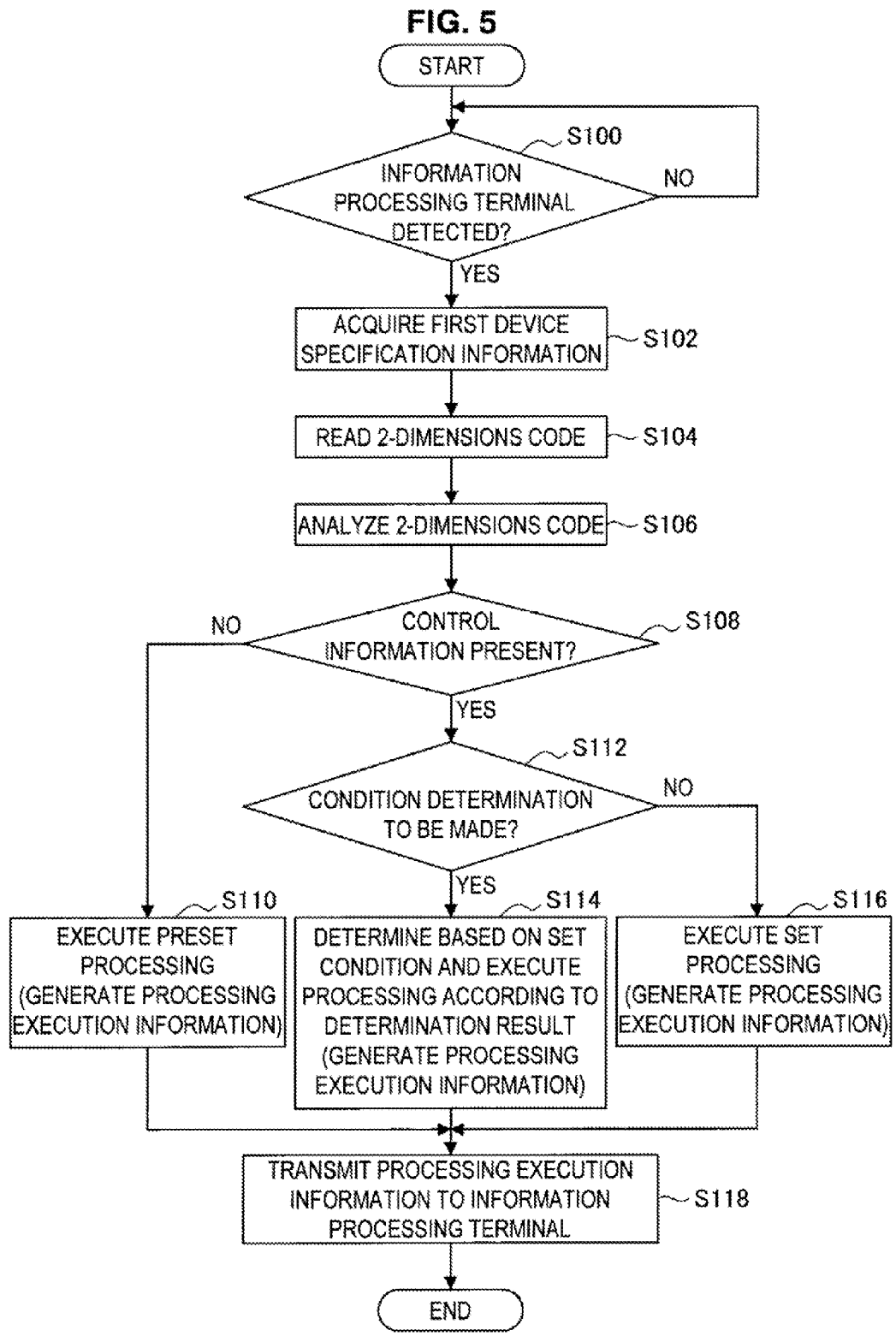

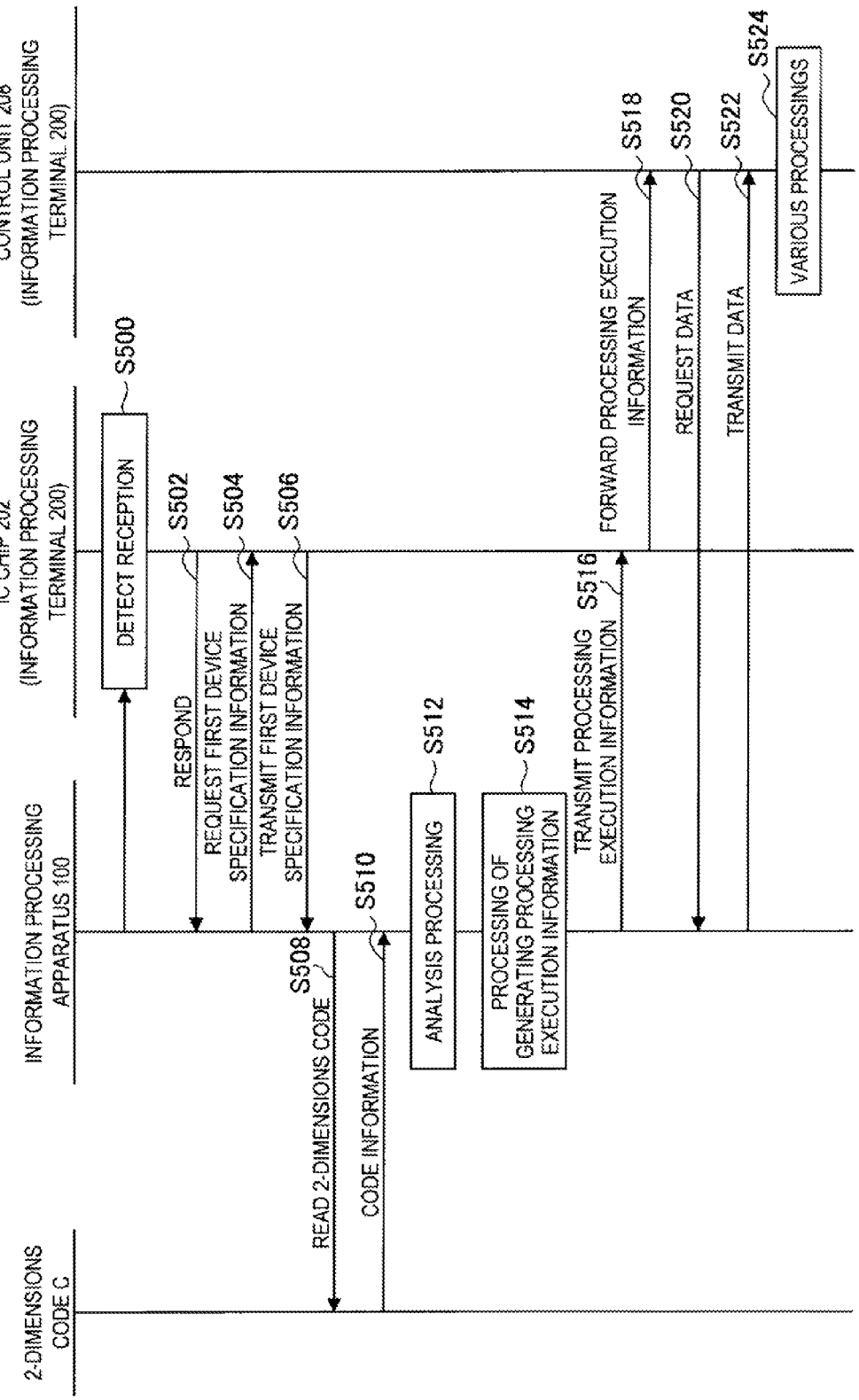

INFORMATION PROCESSING APPARATUS, INFORMATION PROCESSING METHOD, PROGRAM AND INFORMATION PROCESSING SYSTEM

CROSS REFERENCES TO RELATED APPLICATIONS

The present application claims priority to Japanese Priority Patent Application JP 2008-313471 filed in the Japan Patent Office on Dec. 9, 2008, the entire content of which is hereby incorporated by reference.

BACKGROUND

The present invention relates to an information processing apparatus, an information processing method, a program and an information processing system.

In recent years, there have been widely used information processing terminals capable of noncontactly communicating with a reader/writer (or information processing apparatus having a reader/writer function) such as noncontact IC (Integrated Circuit) card, RFID (Radio Frequency Identification) tag and cell phone mounting thereon a noncontact IC chip.

The information processing apparatus having a reader/writer function and the information processing terminal such as IC card and cell phone use a magnetic field (carrier wave) having a specific frequency of, for example, 13.56 MHz for communication. Specifically, the information processing apparatus transmits a carrier wave containing a carrier wave signal, and the information processing terminal which has received the carrier wave via an antenna returns a response signal to the carrier wave signal received by load modulation so that the information processing apparatus and the information processing terminal communicate with each other.

In recent years, a function of reading a 2-dimensions code such as QR code (Quick Response code), Data Matrix, PDF417, Maxi Code and Veri Code has been mounted on the information processing terminal such as cell phone. The above information processing terminal acquires information such as URL data recorded in a 2-dimensions code, thereby eliminating the need of inputting the URL or the like from a user of the information processing terminal. Thus, with the above function, the above information processing terminal can improve user's convenience.

On the other hand, there has been developed a technique for reading a 2-dimensions code recording therein information (or 1D code such as barcode) (which is assumed to include 1D code) and executing a processing based on the information recorded in the 2-dimensions code. There is described in, for example, Japanese Patent Application Laid-Open No. 2006-1063 a technique for reading a 2-dimensions code recording therein wireless LAN setting information or printer setting information to enable the connection with a printer using a wireless LAN. Further, there is described in, for example, Japanese Patent Application Laid-Open No. 2003-330831 a technique for attaching a barcode reader to a cell phone and using the barcode reader to read a barcode recording URL information therein, thereby causing the cell phone to access a website indicated by the URL information.

An information processing terminal to which the related art for reading a 2-dimensions code and executing a processing based on information recorded in the 2-dimensions code (which may be simply referred to as "related art" below) is applied executes a processing depending on the information recorded in the 2-dimensions code. Thus, the information processing terminal to which the related art is applied (simply referred to as "information processing terminal in related art" below) can improve user's convenience to a certain degree. However, the information processing terminal in related art merely reads out static information previously recorded in the 2-dimensions code and executes a processing according to the information. Thus, even when the related art is used, information different for each kind of the information processing terminal may not be transmitted from the 2-dimensions code to the information processing terminal. Therefore, even when the related art is used, the information different from the static information recorded in the 2-dimensions code can be hardly transmitted from the 2-dimensions code to the information processing terminal.

In light of the foregoing, it is desirable to provide a novel and improved information processing apparatus, information processing method, program and information processing system capable of generating information for defining processings to be executed by an information processing terminal based on static information recorded in a 2-dimensions code, and transmitting the generated information to the information processing terminal.

SUMMARY

According to an embodiment, there is provided an information processing apparatus including a communication unit for transmitting a carrier wave having a predetermined frequency, and making noncontact communication with an information processing terminal, a 2-dimensions code read unit for reading a 2-dimensions code recording therein processing information on processings to be executed by the information processing terminal, a 2-dimensions code analysis unit for analyzing the 2-dimensions code read in the 2-dimensions code read unit and acquiring the processing information from the 2-dimensions code, and a processing unit for generating processing execution information for causing the information processing terminal to execute a predetermined processing based on an analysis result by the 2-dimensions code analysis unit, and causing the communication unit to transmit the processing execution information to the information processing terminal.

According to such a configuration, it is possible to generate information for defining processings to be executed by an information processing terminal based on static information recorded in a 2-dimensions code, and transmitting the generated information to the information processing terminal.

The processing unit may generate processing execution information containing the processing information and first device identifying information for specifying the information processing terminal acquired from the information processing terminal, or processing execution information containing the processing information and second device identifying information for specifying the information processing apparatus.

The processing unit may generate processing execution information further containing acquisition data acquired from the information processing terminal.

The processing unit may generate processing execution information containing the processing information, the first device identifying information, the acquisition data and the second device identifying information.

The 2-dimensions code further records therein control information in which conditions for the processings in the processing unit are set, and the processing unit may selectively execute a processing meeting the condition based on the conditions set in the control information acquired by the 2-dimensions code analysis unit from the 2-dimensions code.

The information processing apparatus may further include a detection unit for detecting the information processing terminal. The 2-dimensions code read unit may read the 2-dimensions code when the information processing terminal is detected based on a detection result by the detection unit, and does not read the 2-dimensions code when the information processing terminal is not detected based on a detection result by the detection unit.

The communication unit may transmit the carrier wave when the information processing terminal is detected based on a detection result by the detection unit, and does not transmit the carrier wave when the information processing terminal is not detected based on a detection result by the detection unit.

According to another embodiment, there is provided an information processing method includes the steps of reading a 2-dimensions code recording therein processing information on processings to be executed by an information processing terminal capable of making noncontact communication via a communication path using a carrier wave having a predetermined frequency, analyzing the 2-dimensions code read in the reading step and acquiring the processing information from the 2-dimensions code, generating processing execution information for causing the information processing terminal to execute a predetermined processing based on an analysis result in the acquiring step, and transmitting the processing execution information generated in the generating step to the information processing terminal via a communication unit for transmitting the carrier wave having a predetermined frequency to communicate with the information processing terminal.

By use of such a method, it is possible to generate information for defining processings to be executed by an information processing terminal based on static information recorded in a 2-dimensions code, and transmitting the generated information to the information processing terminal.

According to another embodiment, there is provided a program for causing a computer to execute the steps of reading a 2-dimensions code recording therein processing information on processings to be executed by an information processing terminal capable of making noncontact communication via a communication path using a carrier wave having a predetermined frequency, analyzing the 2-dimensions code read in the reading step and acquiring the processing information from the 2-dimensions code, generating processing execution information for causing the information processing terminal to execute a predetermined processing based on an analysis result in the acquiring step, and transmitting the processing execution information generated in the generating step to the information processing terminal via a communication unit for transmitting the carrier wave having a predetermined frequency to communicate with the information processing terminal.

According to such a program, it is possible to generate information for defining processings to be executed by an information processing terminal based on static information recorded in a 2-dimensions code, and transmitting the generated information to the information processing terminal.

According to another embodiment, there is provided information processing system including an information processing apparatus and an information processing terminal capable of making noncontact communication with the information processing apparatus via a communication path using a carrier wave having a predetermined frequency. The information processing apparatus may include a communication unit for transmitting the carrier wave having a predetermined frequency, and making noncontact communication with the information processing terminal, a 2-dimensions code read unit for reading a 2-dimensions code recording therein processing information on processings to be executed by the information processing terminal, a 2-dimensions code analysis unit for analyzing the 2-dimensions code read in the 2-dimensions code read unit and acquiring the processing information from the 2-dimensions code, and a processing unit for generating processing execution information for causing the information processing terminal to execute a predetermined processing based on an analysis result by the 2-dimensions code analysis unit and causing the communication unit to transmit the processing execution information to the information processing terminal. The information processing terminal may include a terminal side communication unit for making noncontact communication with the information processing apparatus via the communication path using a carrier wave, and a control unit for executing a processing based on the processing execution information received by the terminal side communication unit.

According to such a configuration, there is realized the information processing system capable of generating information for defining processings to be executed by an information processing terminal based on static information recorded in a 2-dimensions code, and transmitting the generated information to the information processing terminal.

According to the embodiments, it is possible to generate information for defining processings to be executed by an information processing terminal based on static information recorded in a 2-dimensions code, and transmitting the generated information to the information processing terminal.

Additional features and advantages are described herein, and will be apparent from the following Detailed Description and the figures.

BRIEF DESCRIPTION OF THE FIGURES

FIG. 3 is an explanatory diagram for explaining the first example of information recorded in a 2-dimensions code according to the embodiment;

FIG. 4 is an explanatory diagram for explaining the second example of information recorded in a 2-dimensions code according to the embodiment;

FIG. 5 is a flowchart showing one example of processings in an information processing apparatus according to the embodiment;

FIG. 12 is an explanatory diagram showing the fourth example of processings in the information processing system according to the embodiment.

DETAILED DESCRIPTION

Figure 1:
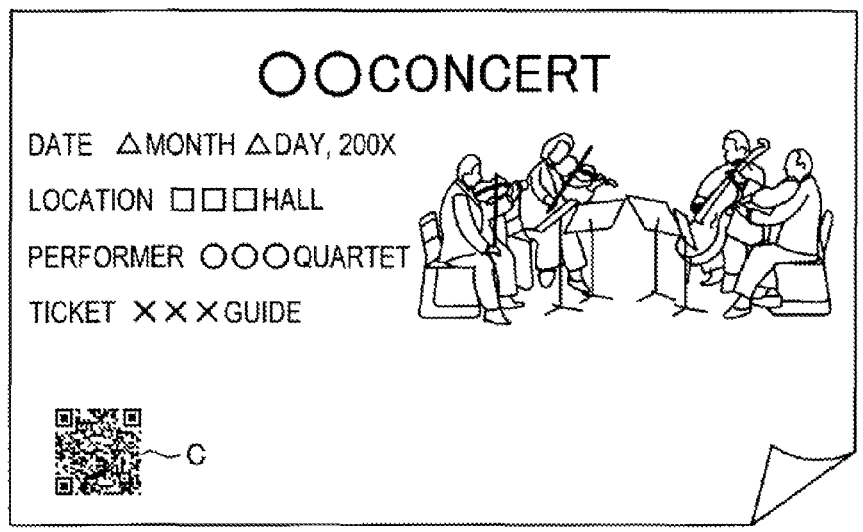
FIG. 1 is an explanatory diagram for explaining an outline of an information transmission approach according to an embodiment.

Hereinafter, embodiments will be described in detail with reference to the appended drawings. Note that, in this specification and the appended drawings, structural elements that have substantially the same function and configuration are denoted with the same reference numerals, and repeated explanation of these structural elements is omitted.

The explanation will be made below in the following order.
1. Approach according to the embodiment of the present invention
2. Information processing system according to the embodiment
3. Program according to the embodiment Approach According to the Embodiment An information transmission approach according to an embodiment will be described prior to explaining a configuration of an information processing system according to the embodiment (referred to as "information processing system 1000" below). In the following, "static information" and "dynamic information" will be employed as one viewpoint for classifying information (data) according to the embodiment of the present invention. The "static information" according to the embodiment is unchanged information (data) such as information previously recorded in a 2-dimensions code, for example. The "dynamic information" according to the embodiment is changed information (data) through various processings on the static information. In other words, the dynamic information according to the embodiment is different from the static information recorded in a 2-dimensions code.

One method for transmitting dynamic information to an information processing terminal includes, for example, a method for transmitting information by using an information processing apparatus having a reader/writer function (or a combination of a reader/writer and a computer) capable of noncontactly communicating with an information processing terminal. The information processing apparatus having a reader/writer function can execute various processings therein, thereby dynamically generating and transmitting information to the information processing terminal. Specifically, for example, the information processing apparatus having a reader/writer function acquires a chip ID of an IC chip for noncontact communication provided in an information processing terminal from the information processing terminal, generates and transmits information depending on the chip ID or the like to the information processing terminal. Thus, information is not transmitted by using a 2-dimensions code unlike in the related art, and information different for each kind of the information processing terminal can be transmitted to the information processing terminal when the information processing apparatus having a reader/writer function is used to transmit information.

When the information processing apparatus having a reader/writer function is used to transmit information, a user of the information processing terminal can acquire the information only by holding the information processing terminal over the information processing apparatus (by moving the information processing terminal such that a distance relative to the information processing apparatus is constant. The case may be). In other words, when the information processing apparatus having a reader/writer function is used to transmit information, an operation of acquiring the information can be simplified more like when a 2-dimensions code is used to transmit information. Thus, when the information processing apparatus having a reader/writer function is used to transmit information, user's convenience can be further improved than a 2-dimensions code is used to transmit information like in the related art.

However, when the information processing apparatus having a reader/writer function is used to transmit information, the setting of the information processing apparatus needs to be changed each time the information to be transmitted to the information processing terminal is changed, for example. Thus, when the information processing apparatus having a reader/writer function is used to transmit information, a burden (operational burden) on an information provider side for information transmission will be further increased than a 2-dimensions code is used to transmit information. Further, when the information processing apparatus having a reader/writer function is used to transmit information, cost for information transmission will be further increased more than a 2-dimensions code is used to transmit information. This is because the 2-dimensions code is only printed on a sheet of print when the 2-dimensions code is used to transmit information while the setting of the information processing apparatus needs to be changed depending on the information when the information processing apparatus having a reader/writer function is used to transmit information.

Therefore, when the information processing apparatus having a reader/writer function is used to transmit information, the dynamic information can be transmitted to an information processing terminal but some disadvantages can occur in terms of operation or cost.

Information Transmission Approach According to Embodiment

As stated above, in the related art for reading a 2-dimensions code and executing a processing depending on information recorded in the 2-dimensions code, the dynamic information may not be transmitted to the information processing terminal. Further, when the information processing apparatus having a reader/writer function is used to transmit information, the dynamic information can be transmitted to the information processing terminal but some disadvantages will occur in terms of operation or cost.

In the embodiment, there is provided an information processing apparatus for generating information for defining processings to be executed by an information processing terminal based on static information recorded in a 2-dimensions code, and transmitting the generated information to the information processing terminal (referred to as "information processing apparatus 100" below). More specifically, in the embodiment of the present invention, the information processing apparatus 100 reads a 2-dimensions code, and generates information for defining processings to be executed by an information processing terminal based on static information recorded in the 2-dimensions code. Then, the information generated by the information processing apparatus 100 is transmitted to the information processing terminal so that the processing based on the static information recorded in the 2-dimensions code is executed by the information processing terminal.

The 2-dimensions code according to the embodiment can include, for example, QR code, Data Matrix, PDF417, Maxi Code, Veri Code and the like, but is not limited thereto. The static information recorded in the 2-dimensions code according to the embodiment includes information on the processings to be executed by the information processing terminal (referred to as "processing information" below) or control information in which the conditions for the processings in the information processing apparatus 100 are set. Specific examples of the information recorded in the 2-dimensions code according to the present invention will be described below with reference to FIGS. 3 and 4. The processings to be executed by the information processing terminal based on the information generated by the information processing apparatus 100 can include, for example, activation of various applications such as browser or mailer, communication with external devices using an activated application, and the like, but are not limited thereto. In the following, the information for defining the processings to be executed by the information processing terminal, which is generated by the information processing apparatus 100, is referred to as "processing execution information".

Figure 2:
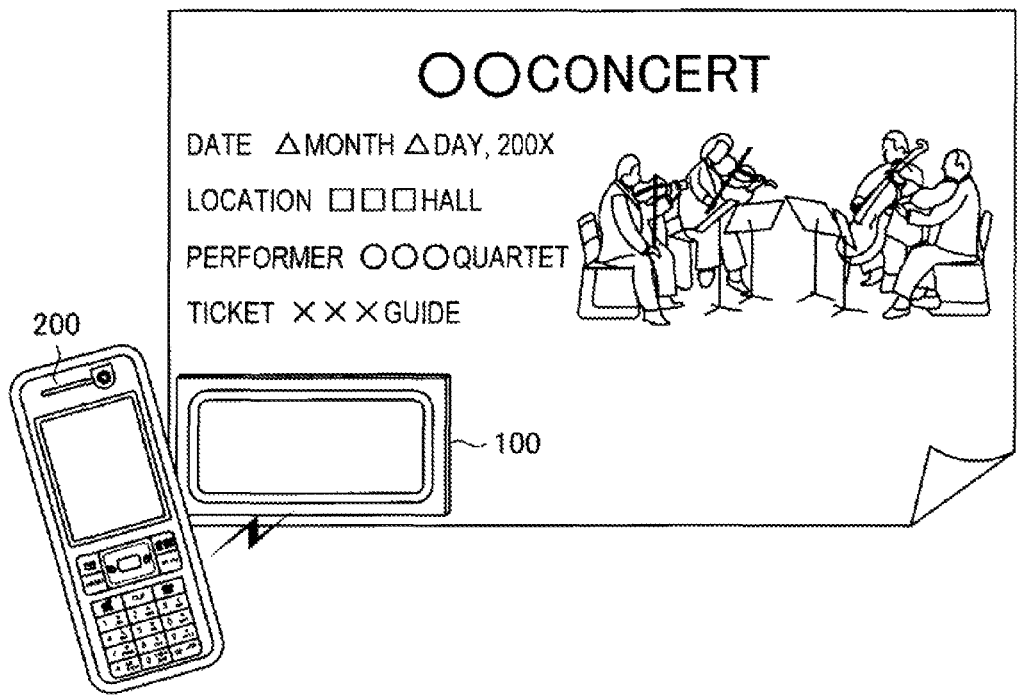
FIG. 2 is an explanatory diagram for explaining an outline of an information transmission approach according to an embodiment.

FIGS. 1 and 2 are explanatory diagrams for explaining the outline of the information transmission approach according to the embodiment. A cell phone is shown as one example of the information processing terminal according to the embodiment (referred to as "information processing terminal 200" below) in FIG. 2, but the information processing terminal 200 is not limited thereto. An outer profile of the information processing apparatus 100 shown in FIG. 2 is one example of the information processing apparatus 100 according to the embodiment of the present invention and is not limited thereto, of course. FIG. 1 shows one example in which one 2-dimensions code C is applied on a sheet of print, but multiple 2-dimensions codes may be applied to a sheet of print without being limited to the above. In the above case, the information processing apparatus according to the embodiment can further include a slide mechanism for individually reading each 2-dimensions code.

As shown in FIG. 1, in the embodiment, the 2-dimensions code C according to the embodiment of the present invention is applied (printed, for example) to a sheet of print such as poster notifying a concert to be held, for example. When the related art is used, the information processing terminal such as cell phone directly reads the 2-dimensions code C as described above. On the contrary, in the, the information processing apparatus 100 is held over the 2-dimensions code C so that the information processing apparatus 100 reads the 2-dimensions code C as shown in FIG. 2. Then, the information processing apparatus 100 generates processing execution information based on the information recorded in the 2-dimensions code C and transmits the generated processing execution information to the information processing terminal 200.

The information processing apparatus 100 and the information processing terminal 200 make noncontact communication with each other by using a magnetic field having a specific frequency such as 13.56 MHz (referred to as "carrier wave" below). More specifically, the information processing apparatus 100 transmits a carrier wave containing a carrier wave signal therein and the information processing terminal 200 which has received the carrier wave via an antenna returns a response signal to the carrier wave signal received by load modulation so that the information processing apparatus 100 and the information processing terminal 200 communicate with each other. In other words, in the information processing system 1000 according to the embodiment, the information processing apparatus 100 serves as a reader/writer for mainly transmitting a carrier wave. Since the information processing apparatus 100 has the reader/writer function, a user of the information processing terminal 200 only holds the information processing terminal 200 over the information processing apparatus 100 so that the information processing terminal 200 can acquire the processing execution information from the information processing apparatus 100. Thus, the information transmission approach according to the embodiment of the present invention is used so that the user does not need to execute a predetermined operation (such as imaging operation) for reading a 2-dimensions code required when the above related art is used. In other words, the information processing system according to the embodiment using the information transmission approach according to the embodiment of the present invention can further improve the user's convenience than the related art is used. The way the information processing apparatus 100 and the information processing terminal 200 communicate with each other is not limited to the above way. For example, the information processing terminal 200 can receive the information transmitted from the information processing apparatus 100 in Passive mode defined in NFC (Near Field Communication). Also in the above case, the information processing system according to the embodiment of the present invention can further improve the user's convenience than the related art is used.

More specifically, in the embodiment, the information processing apparatus 100 executes the following processings (1) to (4), for example, to generate the processing execution information based on the static information recorded in the 2-dimensions code and to transmit the generated information to the information processing terminal 200.

(1) Processing of Detecting Information Processing Terminal 200

The information processing apparatus 100 uses a proximity sensor, for example, to detect the information processing terminal 200. The method in which the information processing apparatus 100 according to the embodiment of the present invention detects the information processing terminal 200 is not limited to the method using the proximity sensor. For example, the information processing apparatus 100 can detect the information processing terminal 200 by the polling in which a carrier wave is periodically/non-periodically transmitted to capture the information processing terminal 200. When the information processing apparatus 100 uses the proximity sensor, for example, to detect the information processing terminal 200, the information processing apparatus 100 does not need to continue the polling, thereby achieving further power saving.

(2) Processing of Acquiring First Device Identifying Information from Information Processing Terminal 200

When the information processing terminal 200 is detected in the above processing (1), the information processing apparatus 100 acquires first device identifying information from the information processing terminal 200. The information processing apparatus 100 can acquire the first device identifying information by, for example, transmitting an information acquiring request to the information processing terminal 200, but the acquisition method is not limited thereto. The first device identifying information is directed for uniquely specifying the information processing terminal 200. The first device identifying information includes a chip ID attached to an IC chip for making communication via a communication path (first communication path) using a carrier wave provided in the information processing terminal 200, for example, but is not limited thereto. For example, the information processing apparatus 100 can acquire, as the first device identifying information, an ID specific to the information processing terminal 200 such as the above chip ID, and additional information such as service ID for identifying a service provider providing a communication service using the information processing terminal 200.

(3) Processing of Generating Processing Execution Information Based on Information Acquired from 2-Dimensions Code C (3-1) Processing of Acquiring Information from 2-Dimensions Code C The information processing apparatus 100 reads a 2-dimensions code C and analyzes the read 2-dimensions code C to acquire the information recorded in the 2-dimensions code C. The information processing apparatus 100 takes an image of the 2-dimensions code C and generates imaging data corresponding to the 2-dimensions code C to analyze the imaging data, for example, thereby acquiring the information recorded in the 2-dimensions code C (referred to as "code information" below).

Examples of Information Recorded in 2-Dimensions Code C According to Embodiment

The 2-dimensions code C according to the embodiment of the present invention will be described below.

[1] First Example

FIG. 3 is an explanatory diagram for explaining the first example of the information recorded in the 2-dimensions code C according to the embodiment. FIG. 3 shows an example in which the processing information on the processings to be executed by the information processing terminal 200 is recorded in the 2-dimensions code C. FIG. 3 shows an example in which three items of processing information (corresponding to each row in FIG. 3) are recorded in the 2-dimensions code C, but one or two, or four or more items of processing information may be recorded therein, of course. In FIG. 3, the information recorded in the 2-dimensions code C is represented by characters for convenience. Each item of information recorded in the 2-dimensions code C is represented by character string, numerical value or script form, for example, but is not limited thereto. Each item of information recorded in the 2-dimensions code C may be encrypted.

With reference to FIG. 3, the processing information according to the first example is made of "behavior type" (I1 of FIG. 3), "activation information" (I2 of FIG. 3), and "OPTION" (I3 of FIG. 3). Here, "behavior type" represents a type of processing or application to be executed by the information processing terminal 200. "Activation information" records therein parameters as trigger for causing the information processing terminal 200 to execute the processings defined in "behavior type", for example. Further, "OPTION" is a kind of supplementary information for the processing information, and records therein information (data) on parameters to be used for the processings defined in "behavior type", for example. FIG. 3 shows one example in which one "OPTION" is recorded as supplementary information for the processing information, but the supplementary information is not limited thereto. For example, the 2-dimensions code C may record therein multiple items of supplementary information as the processing information.

[2] Second Example

FIG. 3 shows the example in which the processing information on the processings to be executed by the information processing terminal 200 is recorded in the 2-dimensions code C. However, the information recorded in the 2-dimensions code C according to the embodiment of the present invention is not limited to the processing information. For example, the 2-dimensions code C according to the embodiment of the present invention can further record therein control information for controlling the processings in the information processing apparatus 100. The control information according to the embodiment includes a conditional instruction for causing the information processing apparatus 100 to execute a processing meeting the condition, an instruction for defining the processings of the information processing apparatus 100, and the like, but is not limited thereto. The control information according to the embodiment is represented by script, for example, but is not limited thereto. The control information is recorded in the 2-dimensions code C so that the information processing apparatus 100 can generate the processing execution information more flexibly based on the static information recorded in the 2-dimensions code C.

FIG. 4 is an explanatory diagram for explaining the second example of the 2-dimensions code C according to the embodiment. FIG. 4 shows an example in which the processing information and the control information are recorded in the 2-dimensions code C. In FIG. 4, I1 to I4 correspond to the processing information and I5 corresponds to the control information.

With reference to FIG. 4, the 2-dimensions code C according to the second example has therein the processing information similar to that in the 2-dimensions code C according to the first example shown in FIG. 3. As shown in FIG. 4, the processing information according to the embodiment may record therein multiple items of supplementary information (I3 and I4 of FIG. 4). The control information (I5 of FIG. 4) records therein a conditional instruction for causing the information processing apparatus 100 to execute a processing meeting the condition (such as I5_1 of FIG. 4), and an instruction for causing the information processing apparatus 100 to execute a predetermined processing (such as I5_2 of FIG. 4). The instructions set in the control information are not limited to those shown in FIG. 4. For example, various instructions can be set in the control information, such as an instruction of "reading predetermined data recorded in the IC chip of the information processing terminal 200 and adding the read data". As shown by I5_3 of FIG. 4, the control information may record therein no instructions. When an instruction is not recorded as shown in I5_3 of FIG. 4, the information processing apparatus 100 executes a predefined processing in the apparatus.

The 2-dimensions code C according to the embodiment of the present invention records therein the information shown in FIGS. 3 and 4, for example. The information recorded in the 2-dimensions code C according to the embodiment of the present invention is not limited to the examples shown in FIGS. 3 and 4, of course.

(3-2) Processing of Generating Processing Execution Information

The information processing apparatus 100 generates the processing execution information based on the analysis result of the 2-dimensions code C in the above processing (3-1).

[A] A Case Where Control Information is Not Present

The information processing apparatus 100 generates preset predetermined processing execution information based on the processing information when the control information is not present (in the case of FIG. 3, for example) as a result of the analysis of the 2-dimensions code C. The processing execution information generated in the above case includes the following information, for example, but is not limited thereto. Second device identifying information is directed for specifying the information processing apparatus 100. The second device identifying information includes ID information specific to the information processing apparatus 100, for example, but is not limited thereto.

Processing Information

Processing information+first device identifying information

Processing information+second device identifying information

[B] A Case Where Control Information is Present

The information processing apparatus 100 executes a processing depending on the instruction set in the control information when the control information is present (in the case of FIG. 4, for example) as a result of the analysis of the 2-dimensions code C. The information processing apparatus 100 can further acquire predetermined data (such as data recorded in the IC chip) from the information processing terminal 200 by communicating with the information processing terminal 200 in response to the instruction set in the control information, for example. Thus, the information processing apparatus 100 can generate the processing execution information more flexibly than the above case [A]. The processing execution information generated in the above case includes the following information, for example, but is not limited thereto.

Processing Information

Processing information+first device identifying information

Processing information+second device identifying information

Processing information+first device identifying information+second device identifying information Processing information+first device identifying information+data acquired from the information processing terminal 200 (acquisition data)

Processing information+first device identifying information+second device identifying information+data acquired from the information processing terminal 200 (acquisition data)

The information processing apparatus 100 can generate the information (processing execution information) for defining the processings to be executed by the information processing terminal based on the static information recorded in the 2-dimensions code C by executing the above processing (3-1) and the above processing (3-2), for example. As shown in [A] and [B], the information processing apparatus 100 can assume the processing information itself which is the static information recorded in the 2-dimensions code C as the processing execution information.

(4) Processing of Transmitting Processing Execution Information

The information processing apparatus 100 transmits the processing execution information generated in the above processing (3) to the information processing terminal 200 via the first communication path using a carrier wave. The information processing apparatus 100 transmits the processing execution information through ASK (Amplitude Shift Keying) modulation, for example, but is not limited thereto.

The information processing apparatus 100 can generate the processing execution information based on the static information recorded in the 2-dimensions code and transmit the generated processing execution information to the information processing terminal 200 through the above processings (1) to (4), for example.

The information processing terminal 200 which has received the processing execution information transmitted by the information processing apparatus 100 executes a processing depending on the received processing execution information. The information processing apparatus 100 generates and transmits the processing execution information further added with various items of information in addition to the processing information recorded in the 2-dimensions code C as described above. Thus, the information transmission approach according to the embodiment of the present invention is used so that the following (a) to (e) will be realized. Besides, the other than (a) to (e) can be, of course, implemented by use of the information transmission approach according to the embodiment of the present invention.

(a) An external device such as server acquires the information "who (first device identifying information) looked at what (processing information recorded in the 2-dimensions code C) where (second device identifying information)" via the information processing terminal 200

(b) The processing execution information different for each user is transmitted to the information processing terminal 200

The information processing apparatus 100 determines whether the first device identifying information or the data acquired from the information processing terminal 200 meets a predetermined condition, and generates the processing execution information depending on the determination result, for example, thereby realizing the following.

to cause the information processing terminal 200 to access a website corresponding to a service provider (such as portable carrier wave) providing a communication service using the information processing terminal 200 to cause the information processing terminal 200 to access either a website for members of the service or a website for general customers depending on the presence of member information of a certain service (c) The processing execution information different for each information processing terminal 200 is transmitted to the information processing terminal 200

The information processing apparatus 100 determines whether the first device identifying information meets a predetermined condition, and generates the processing execution information depending on the determination result, for example, thereby realizing the following.

based on a determination result as to whether the information processing terminal 200 has a predetermined function, to cause the information processing terminal 200 to execute a processing using the function when the information processing terminal 200 has the function, and to cause the information processing terminal 200 to execute a processing using a general purpose function when the information processing terminal 200 does not have the function based on a determination result as to whether the information processing terminal 200 has a predetermined function, when the information processing terminal 200 has the function, the processing execution information is transmitted to the information processing terminal 200 through a specific communication system such as FALP (FeliCa Ad-hoc Link Protocol) communication (d) Data communication using an application activated by the information processing terminal 200 based on the processing execution information When the data recorded in the 2-dimensions code C is difficult to transmit via the first communication path using a carrier wave, the following processings are executed, for example, so that the information processing terminal 200 can acquire the data. The data which is difficult to transmit via the first communication path using a carrier wave includes data having a large data size, for example. Even when the data having a large data size is recorded in the 2-dimensions code C, the following processings are executed, for example, so that the information processing terminal 200 can acquire the data from the information processing apparatus 100.

The processing execution information causes the information processing terminal 200 to activate the predetermined application. The information processing terminal 200 makes communication between a first communication unit 220 (described later) and a communication unit 102 (described later) of the information processing apparatus 100 via the first communication path using a protocol for device communication. Alternatively, the information processing terminal 200 communicates with the information processing apparatus 100 via a communication path other than the first communication path. Then, the information processing terminal 200 acquires the data recorded in the 2-dimensions code C from the information processing apparatus 100.

(e) Other Processings

Further, the information processing apparatus 100 can cause the information processing terminal 200 to execute processings depending on the processing information recorded in the 2-dimensions code C as described later, for example.

Access to website: To activate a browser by the processing information and to access a website indicated by the URL designated by the processing information Activation of e-mail software: To activate e-mail software by the processing information and to display the contents indicated by the processing information as e-mail on the terminal Address registration: To activate e-mail software by the processing information, to activate PIM (Personal Information Manager) software, and to register the PIM information indicated by the processing information Activation of other predetermined applications: To activate an application designated by the processing information and to hand over information contained in the processing information to the application Specific Examples of a Series of Processings in Information Processing Apparatus 100

As stated above, in the embodiment, the information processing apparatus 100 executes the above processings (1) to (4) to generate the processing execution information based on the static information recorded in the 2-dimensions code and to transmit the generated processing execution information to the information processing terminal 200. Next, specific examples of a series of processings in the information processing apparatus 100 will be described in order to collectively explain the processings for realizing the information transmission approach according to the embodiment of the present invention. FIG. 5 is a flowchart showing one example of the processings in the information processing apparatus 100 according to the embodiment.

The information processing apparatus 100 detects whether the information processing terminal 200 has been detected (S100). The information processing apparatus 100 makes a determination in step S100 based on a detection result by a proximity sensor for detecting an always, periodically or non-periodically approaching object, for example, but is not limited thereto. For example, the information processing apparatus 100 can execute polling after an object has been detected by the proximity sensor, and when the information processing terminal 200 has been captured by the polling, determine that the information processing terminal 200 has been detected.

When it is not determined in step S100 that the information processing terminal 200 has been detected, the information processing apparatus 100 may not advance the processing until it is determined that the information processing terminal 200 has been detected.

When it is determined in step S100 that the information processing terminal 200 has been detected, the information processing apparatus 100 acquires the first device identifying information such as IC chip's ID from the information processing terminal 200 (S102).

The information processing apparatus 100 reads the 2-dimensions code C (S104) and analyzes the read 2-dimensions code C (S106).

FIG. 5 shows an example in which the processing in step S104 is executed after the processing in step S102, but the processing in step S102 and the processing in step S104 can be independently executed. Thus, the information processing apparatus 100 can execute the processing in step S102 and the processing in step S104 in a synchronized manner, or can execute the processing in step S102 after the processing in step S104.

The information processing apparatus 100 determines whether the control information is contained in the 2-dimensions code C based on the analysis result in step S106 (S108). When it is determined in step S108 that the control information is not contained, the information processing apparatus 100 executes a preset processing and generates the processing execution information depending on the processing based on the information in the 2-dimensions code C other than the control information (S110).

When it is determined in step S108 that the control information is contained, the information processing apparatus 100 determines whether to make a condition determination (S112). The information processing apparatus 100 determines to make a condition determination when an instruction of making a condition determination on the control information is recorded, for example, based on the analysis result in step S106.

When it is determined in step S112 that the condition determination is made, the information processing apparatus 100 makes a determination based on the set condition, executes a processing depending on the determination result, and generates the processing execution information depending on the processing (S114). The information processing apparatus 100 can use the information acquired from the information processing terminal 200 to make the above determination.

When it is not determined in step S112 that the condition determination is made, the information processing apparatus 100 executes a processing set in the control information (processing depending on the instruction recorded in the control information) and generates the processing execution information depending on the processing based on the information in the 2-dimensions code C other than the control information (S116).

The information processing apparatus 100 transmits the processing execution information generated in any one processing among steps S110, S114 and S116 to the information processing terminal 200 (S118).

The information processing apparatus 100 can execute the processings shown in FIG. 5, for example, to generate the processing execution information based on the static information recorded in the 2-dimensions code and to transmit the generated processing execution information to the information processing terminal 200.

Information Processing System 1000 According to Embodiment

Next, a configuration example of the information processing system 1000 according to the embodiment will be described, which can realize the information transmission approach according to the embodiment described above.

Figure 6:
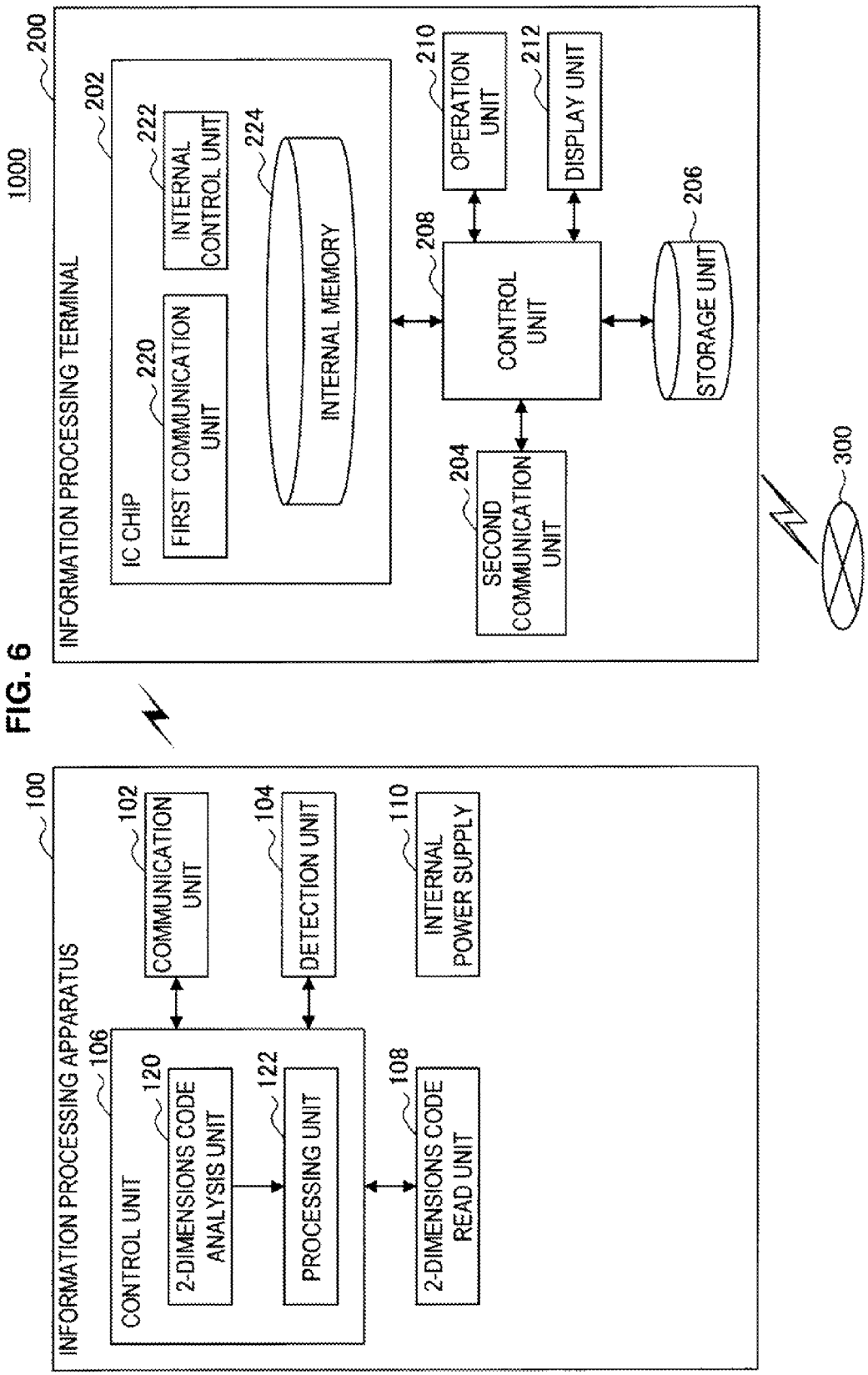
FIG. 6 is an explanatory diagram showing one example of a configuration of an information processing system according to the embodiment.

FIG. 6 is an explanatory diagram showing one example of the configuration of the information processing system 1000 according to the embodiment. FIG. 6 shows a configuration in which the information processing terminal 200 has two kinds of communication function such as a first communication function of communicating with the information processing apparatus 100 and a second communication function of communicating with an external device (not shown) such as server via a network 300. The information processing terminal according to the embodiment is not limited to the configuration having the two communication functions, of course. For example, the information processing terminal according to the embodiment may have only the first communication function described above or have three or more communication functions. In the following, a communication path for the first communication function may be referred to as first communication path (communication path using a carrier wave) and a communication path for the second communication function may be referred to as second communication path.

The network 300 includes a wireless network such as wireless WAN (WWAN; Wireless Wide Area Network) or wireless MAN (WMAN; Wireless Metropolitan Area Network) via a base station, a wired network such as LAN (Local Area Network) or WAN (Wide Area Network), Internet using a communication protocol such as TCP/IP (Transmission Control Protocol/Internet Protocol), and the like, for example, but is not limited thereto.

[Information Processing Apparatus 100]

At first, the configuration of the information processing apparatus 100 will be described. The information processing apparatus 100 includes a communication unit 102, a detection unit 104, a control unit 106, a 2-dimensions code read unit 108 and an internal power supply 110.

The information processing apparatus 100 may include a ROM (Read Only Memory; not shown), a RAM (Random Access Memory; not shown) and the like, for example. The information processing apparatus 100 can connect the respective constituents via a bus as a data transmission path, for example. The ROM stores therein control data such as programs or calculation parameters to be used by the control unit 106. The RAM temporarily stores therein programs to be executed by the control unit 106.

Example of Hardware Configuration of Information Processing Apparatus 100

Figure 7:
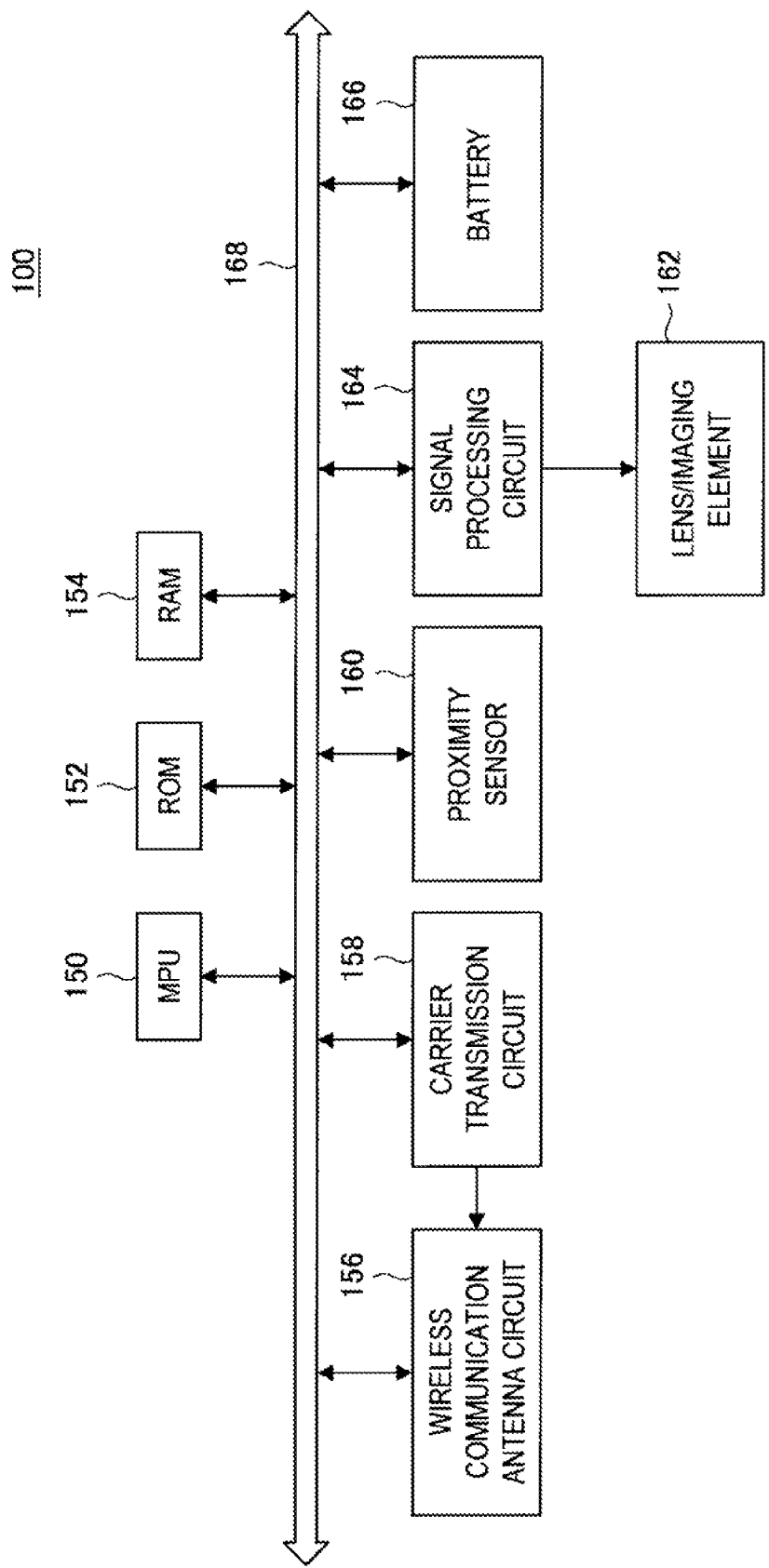
FIG. 7 is an explanatory diagram showing one example of a hardware configuration of the information processing apparatus according to the embodiment.

FIG. 7 is an explanatory diagram showing one example of a hardware configuration of the information processing apparatus 100 according to the embodiment. With reference to FIG. 7, the information processing apparatus 100 includes a MPU 150, a ROM 152, a RAM 154, a wireless communication antenna circuit 156, a carrier wave transmission circuit 158, a proximity sensor 160, a lens/imaging element 162, a signal processing circuit 164 and a battery 166, for example. Further, the information processing apparatus 100 connects the respective constituents via a bus 168 as a data transmission path, for example.

The MPU 150 is made of a chip set in which multiple circuits are integrated for realizing a MPU (Micro Processing Unit) or control function, and functions as the control unit 106 for controlling the entire information processing apparatus 100. Further, the MPU 150 can serve as a 2-dimensions code analysis unit 120 or a processing unit 122-dimensions described later in the information processing apparatus 100.

The ROM 152 stores therein the control data such as programs or calculation parameters to be used by the MPU 150 and the RAM 154 temporarily stores therein programs and the like to be executed by the MPU 150.

The wireless communication antenna circuit 156 is a communication means provided in the information processing apparatus 100. The wireless communication antenna circuit 156 is configured with an oscillation circuit, as transmission/reception antenna, made of a coil having a predetermined inductance and a capacitor having a predetermined electrostatic capacity, and a demodulation circuit. The wireless communication antenna circuit 156 transmits a carrier wave and detects a change in voltage (change due to diamagnetic field) occurring at the end of the transmission/reception antenna depending on load modulation in the information processing terminal 200, for example, to extract a response as a signal from the information processing terminal 200.

The carrier wave transmission circuit 158 includes a modulation circuit for executing ASK modulation, an amplification circuit for amplifying an output of the modulation circuit, and the like, and transmits a carrier wave containing a carrier wave signal from the transmission/reception antenna of the wireless communication antenna circuit 156. The carrier wave transmission circuit 158 is provided so that the information processing apparatus 100 can has a so-called reader/writer function. The carrier wave signal transmitted by the carrier wave transmission circuit 158 from the wireless communication antenna circuit 156 includes a detection signal for the above polling, a signal indicative of the processing execution information, and the like, for example. Further, the carrier wave transmission circuit 158 is controlled in its transmission of the carrier wave by the MPU 150, for example.

Therefore, the wireless communication antenna circuit 156 and the carrier wave transmission circuit 158 function as the communication unit 102 forming the first communication path in the information processing apparatus 100.

The proximity sensor 160 serves as the detection unit 104 and detects an always, periodically or non-periodically approaching object. The proximity sensor 160 includes a photoelectronic sensor using a laser light, for example, but is not limited thereto.

The lens/imaging element 162 and the signal processing circuit 164 function as the 2-dimensions code read unit 108. The lens/imaging element 162 is configured with an image sensor using an optical lens and multiple imaging devices such as CCD (Charged Coupled Device) or CMOS (Complementary Metal Oxide Semiconductor), for example. The signal processing circuit 164 includes an AGC (Automatic Gain Control) circuit or ADC (Analog to Digital Converter) and converts an analog signal generated by the imaging devices into a digital signal (data). Further, the signal processing circuit 164 can further execute various signal processings such as White Balance correction processing, interpolation processing, color correction processing and gamma correction processing.

The battery 166 serves as the internal power supply 110 and supplies a drive voltage to each constituent of the information processing apparatus 100. The battery 166 includes a secondary battery such as lithium-ion rechargeable battery, but is not limited thereto.

The information processing apparatus 100 realizes the aforementioned processings (1) to (4) with the hardware configuration as shown in FIG. 7, for example. The configuration of the information processing apparatus 100 according to the embodiment is not limited to the configuration shown in FIG. 7, of course.

With reference to FIG. 6 again, the constituents of the information processing apparatus 100 will be described. The communication unit 102 transmits a carrier wave having a predetermined frequency such as 13.56 MHz to make non-contact communication with the information processing terminal 200. The communication unit 102 is configured with the wireless communication antenna circuit 156, the carrier wave transmission circuit 158 and the like, for example. The transmission of a carrier wave and the transmission of a carrier wave signal in the communication unit 102 are controlled by the control unit 106, for example. As one example of the control by the control unit 106, the communication unit 102 starts to transmit a carrier wave based on the control signal transmitted when the information processing terminal 200 is detected. In other words, the communication unit 102 can selectively transmit a carrier wave when the information processing terminal 200 is detected based on the detection result by the detection unit 104 described later as shown in steps S100 and S102 of FIG. 5.

The detection unit 104 is configured with the proximity sensor 160 or the like, and detects an always, periodically or non-periodically approaching object. When detecting an approach of an object, the detection unit 104 transmits a detection signal to the control unit 106, for example. The control unit 106 receiving the detection signal causes the communication unit 102 to execute the polling operation, and when the information processing terminal 200 has been captured, determines that the information processing terminal 200 has been captured. In other words, in the example of FIG. 6, for example, the communication unit 102, the detection unit 104 and the control unit 106 function as a detection unit for detecting the information processing terminal 200. Further, in the information processing apparatus 100, for example, the communication unit 102, the detection unit 104 and the control unit 106 serve to execute the above processing (1). A determination is made based on the detection result of the detection unit 104 as described above as to whether the information processing terminal 200 has been captured, so that the information processing apparatus 100 can achieve more power saving than the polling is executed always, periodically or non-periodically.

The method for detecting the information processing terminal 200 in the information processing apparatus according to the embodiment is not limited thereto. For example, the information processing apparatus according to the embodiment can determine a detection of the information processing terminal 200 based on the detection result by the detection unit 104. Further, the information processing apparatus according to the embodiment always, periodically or non-periodically executes polling without the detection unit 104, thereby detecting the information processing terminal 200.

The control unit 106 is configured with the MPU, for example, and serves to control the entire information processing apparatus 100. The control unit 106 includes the 2-dimensions code analysis unit 120 and the processing unit 122 and serves to mainly execute the above processings (2) to (4). The control unit 106 can further include a communication control unit (not shown) serving to control the communication unit 102, or a 2-dimensions code read control unit (not shown) for controlling to read the 2-dimensions code C in the 2-dimensions code read unit 108. The 2-dimensions code analysis unit 120 analyzes the 2-dimensions code C read in the 2-dimensions code read unit 108. The processing unit 122 generates the processing execution information based on the analysis result of the 2-dimensions code analysis unit 120 and transmits the generated processing execution information to the information processing terminal 200.

More specifically, the control unit 106 executes the respective processings in steps S102 to 118 shown in FIG. 5, for example, in cooperation with the communication control unit 102 and the 2-dimensions code read unit 108 (by controlling the communication unit 102 and the 2-dimensions code read unit 108) when the information processing terminal 200 is detected. The control unit 106 selectively transmits a control signal to the communication unit 102 or the 2-dimensions code read unit 108 when the information processing terminal 200 is detected, for example, to control the communication unit 102 and the 2-dimensions code read unit 108, but the control method by the control unit 106 is not limited thereto.

The 2-dimensions code read unit 108 is controlled by the control unit 106 to selectively read the 2-dimensions code C depending on the control signal transmitted from the processing unit 122 of the control unit 106, for example, and to transmit the data (code information) depending on the reading result to the control unit 106. In other words, the 2-dimensions code read unit 108 selectively reads the 2-dimensions code C when the information processing terminal 200 is detected based on the detection result of the detection unit 104. The 2-dimensions code read unit 108 is configured with the lens/imaging element 162 or the signal processing circuit 164, for example, to read the 2-dimensions code C by the imaging.

The internal power supply 110 serves to supply a drive voltage to each constituent. A power supply line for supplying a drive voltage to each constituent is not shown in FIG. 6.

The information processing apparatus 100 can realize the above processings (1) to (4) with the configuration shown in FIG. 6, for example. Thus, the information processing apparatus 100 can generate the processing execution information based on the static information recorded in the 2-dimensions code C and transmit the generated processing execution information to the information processing terminal 200 with the configuration shown in FIG. 6.

The configuration of the information processing apparatus according to the embodiment is not limited to the configuration shown in FIG. 6. For example, the information processing apparatus according to the embodiment may further have another communication function capable of communicating with the information processing terminal 200 other than the first communication path using a carrier wave. Another communication function included in the information processing apparatus according to the embodiment includes an infrared communication function for making infrared communication or a communication function for making communication according to the IEEE802.11b, but is not limited thereto. For example, the information processing apparatus according to the embodiment can use the above second communication path to communicate with the information processing terminal 200. With the above configuration, the information processing apparatus according to the embodiment can use a communication function other than the first communication path to communicate with the information processing terminal 200. Thus, in the information processing system 1000 having the information processing apparatus with the above configuration, for example, data having a large data size, which is difficult to transmit on a carrier wave, can be exchanged between the information processing apparatus 100 and the information processing terminal 200. One example of the processings in the information processing system 1000 having the information processing apparatus with the above configuration will be described later with reference to FIG. 12.

[Information Processing Terminal 200]

One example of the configuration of the information processing terminal 200 according to the embodiment will be described below. The information processing terminal 200 includes an IC chip 202, a second communication unit 204, a storage unit 206, a control unit 208, an operation unit 210 and a display unit 212.

Further, the information processing terminal 200 may include a ROM (not shown), a RAM (not shown) and the like. The information processing terminal 200 can connect the respective constituents via a bus as a data transmission path, for example. The ROM stores therein control data such as programs and calculation parameters to be used by the control unit 208. The RAM temporarily stores therein programs to be executed by the control unit 208.

Example of Hardware Configuration of Information Processing Terminal 200

Figure 8:
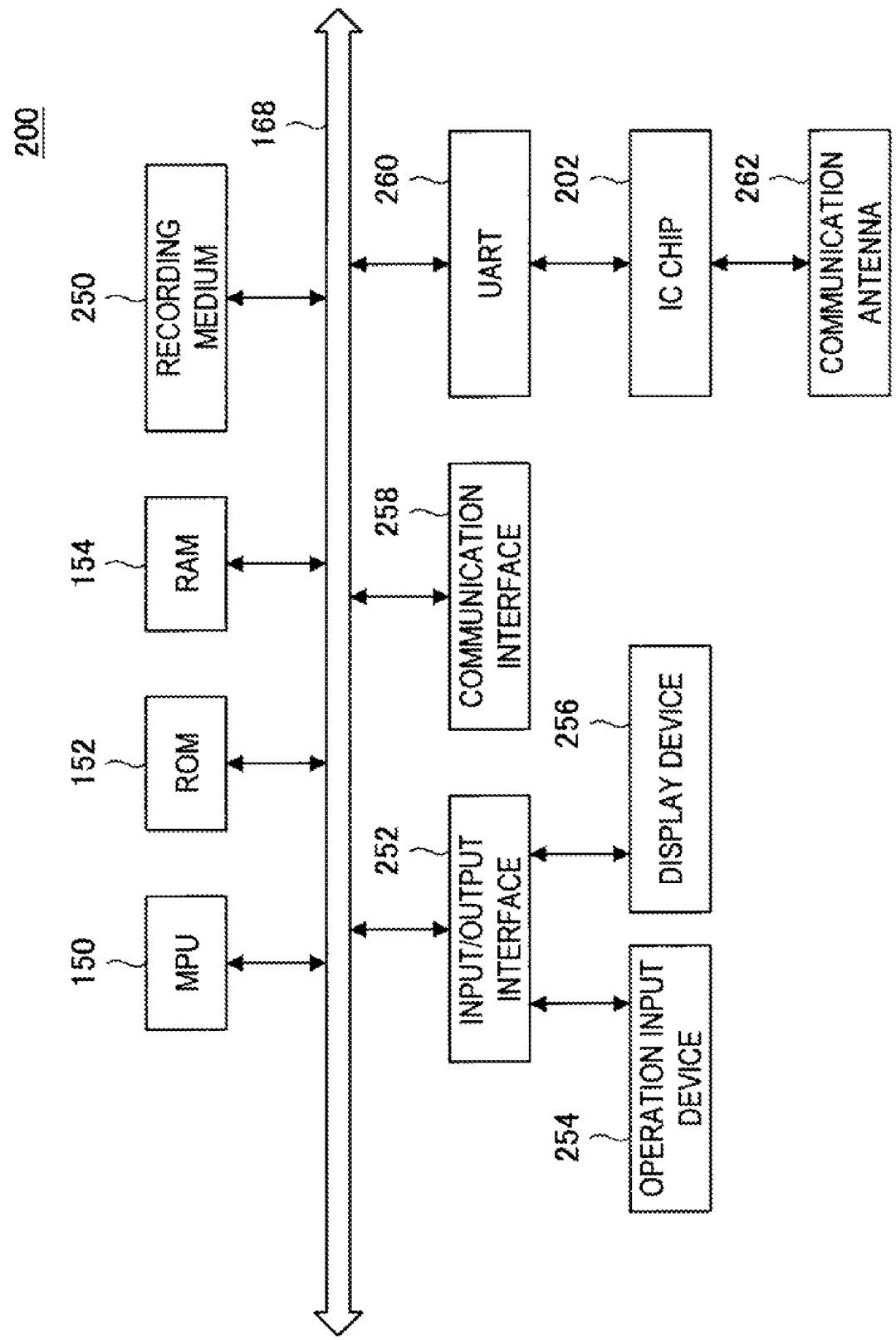
FIG. 8 is an explanatory diagram showing one example of a hardware configuration of an information processing terminal according to the embodiment.

FIG. 8 is an explanatory diagram showing one example of a hardware configuration of the information processing terminal 200 according to the embodiment. With reference to FIG. 8, the information processing terminal 200 includes the MPU 150, the ROM 152, the RAM 154, a recording medium 250, an input/output interface 252, an operation input device 254, a display device 256, a communication interface 258, a UART (Universal Asynchronous Receiver Transmitter) 260, the IC chip 202 and a communication antenna 262, for example. The information processing terminal 200 connects the respective constituents via the bus 168 as a data transmission path, for example.

The MPU 150 is made of a chip set in which multiple circuits are integrated for realizing a MPU or control function, and functions as the control unit 208 for controlling the entire information processing terminal 200.

The ROM 152 stores therein control data such as programs and calculation parameters to be used by the MPU 150, and the RAM 154 temporarily stores therein programs to be executed by the MPU 150.

The recording medium 250 functions as the storage unit 206 and stores therein various items of data such as applications. The recording medium 250 includes a magnetic recording medium such as hard disk and a nonvolatile memory such as EEPROM (Electrically Erasable and Programmable Read Only Memory), flash memory, MRAM (Magnetoresistive Random Access Memory), FeRAM (Ferroelectric Random Access Memory) and PRAM (Phase change Random Access Memory), but is not limited thereto.

The input/output interface 252 is connected to the operation input device 254 or the display device 256, for example. The operation input device 264 functions as the operation unit 210 and the display device 256 functions as the display unit 212. The input/output interface 252 includes a USB (Universal Serial Bus) terminal, a DVI (Digital Visual Interface) terminal, a HDMI (High-Definition Multimedia Interface) terminal and the like, for example, but is not limited thereto. The operation input device 254 is provided in the information processing terminal 200, for example, to be connected to the input/output interface 252 inside the information processing terminal 200. The operation input device 254 includes buttons, directional keys, rotational selector such as jog dial, or a combination thereof, but is not limited thereto. Further, the display device 256 is provided in the information processing terminal 200, for example, and is connected to the input/output interface 252 inside the information processing terminal 200. The display device 256 includes a LCD (Liquid Crystal Display), an organic EL display (organic ElectroLuminescence display) (which may be also referred to as OLED display (Organic Light Emitting Diode display)) and the like, for example, but is not limited thereto. The input/output interface 252 can be connected to the operation input device (such as keyboard or mouse) or the display device (such as external display) as external devices of the information processing terminal 200, of course.

The communication interface 258 is a communication means provided in the information processing terminal 200, and functions as the second communication unit 204 for making wired/wireless communication with an external device such as server via the network 300 (or directly). The communication interface 258 includes communication antenna and RF circuit (wireless communication), IEEE802.15.1 port and transmission/reception circuit (wireless communication), IEEE802.11b port and transmission/reception circuit (wireless communication), LAN terminal and transmission/reception circuit (wired communication), or the like, for example, but is not limited thereto. For example, the communication interface 258 can be configured to correspond to the network 300.

The UART 260 serves as an interface for connecting the IC chip 202 and the bus 168.

The IC chip 202 realizes various functions for the communication using a carrier wave (the communication via the first communication path) with the information processing apparatus 100 in an integrated circuit. The IC chip 202 is connected with the communication antenna 262, as the transmission/reception antenna, which is configured with an oscillation circuit made of a coil having a predetermined inductance and a capacitor having a predetermined electrostatic capacity, and makes communication via the communication antenna 262. A circuit in which the IC chip 202 is integrated includes a demodulation circuit or regulator, a load modulation circuit made of a load resistor and a switching circuit for selectively executing load modulation, a processing circuit for controlling various data processings or load modulation, a memory device capable of storing therein data, and the like. The IC chip 202 may further include a carrier wave detection circuit for generating a rectangular detection signal in order to detect a reception of a carrier wave based on a reception voltage occurring due to electromagnetic induction on the communication antenna's receiving the carrier wave. For example, the above detection signal is transmitted to the processing circuit so that the IC chip 200 can detect the reception of the carrier wave.

The IC chip 202 is configured with the integrated circuit in which the above circuit is integrated so that the IC chip 202 can execute the processings depending on various instructions transmitted from the information processing apparatus 100, transmit a response signal to the polling, transmit the first device identifying information, and the like. Further, the IC chip 202 can execute a processing based on the processing execution information transmitted from the information processing apparatus 100 (or transmit the processing execution information to the MPU 150).

The information processing terminal 200 can execute the processings depending on various instructions transmitted from the information processing apparatus 100 and further execute the processings based on the processing execution information with the configuration shown in FIG. 8, for example.

With reference to FIG. 6 again, various functions for the communication using a carrier wave (communication via the first communication path) with the information processing apparatus 100 are realized in the integrated circuit. The IC chip 202 includes the first communication unit 220 (terminal side communication unit), an internal control unit 222 and an internal memory 224.

The first communication unit 220 demodulates a carrier wave signal received by the communication antenna (not shown) connected thereto, and transmits the demodulated data to the internal control unit 222. Further, the first communication unit 220 transmits a response signal via the communication antenna (not shown) by the load modulation executed in the load modulation circuit (not shown).

The internal control unit 222 executes various processings based on various instructions or items of data indicated by the carrier wave signal demodulated in the first communication unit 220.

The internal memory 224 is a storage unit provided in the IC chip 202 and has tamer-resistance, for example. The internal memory 224 stores therein information on the IC chip's ID, service data such as electronic value, and the like, for example.

The IC chip 202 can communicate with the information processing apparatus 100 via the first communication path and execute various processings for the communication with the above configuration, for example. The configuration of the information processing terminal according to the embodiment is not limited to the configuration including the IC chip 202 shown in FIG. 6. For example, the information processing terminal according to the embodiment can include an IC chip in which part of the internal control unit 222 or part of the internal memory 224 shown in FIG. 6 is separable. The information processing terminal according to the embodiment of the present invention can use the control unit 208 or the storage unit 206 shown in FIG. 6 in the communication with the information processing apparatus 100 via the first communication path.

The second communication unit 204 is a communication means provided in the information processing terminal 200 and makes wireless/wired communication with an external device such as server via the network 300 (or directly). In other words, the second communication unit 204 serves to communicate with an external device via the second communication path. Further, the second communication unit 204 is controlled in its communication by the control unit 208, for example.

The storage unit 206 is a storage means provided in the information processing terminal 200 and stores therein various applications or various items of data including data used for each application such as PIM information. The storage unit 206 includes a magnetic recording medium such as hard disk, a nonvolatile memory such as flash memory, and the like, but is not limited thereto.

The control unit 208 is configured with a MPU or chip set, for example, and serves to control the entire information processing terminal 200. Further, the control unit 208 executes the processing depending on the processing execution information transmitted from the information processing apparatus 100. The internal control unit 222 of the IC chip 202 or the control unit 208 is provided so that the information processing terminal 200 can execute the processing depending on the processing execution information.

The operation unit 210 is provided in the information processing terminal 200 operable by the user. The information processing terminal 200 includes the operation unit 210 to execute user-desired processings. The operation unit 210 includes an operation input device such as keyboard or mouse, buttons, directional keys, a rotational selector such as jog dial, or a combination thereof, for example, but is not limited thereto.

The display unit 212 is provided in the information processing terminal 200 and displays various items of information on a display screen. A screen displayed on the display screen of the display unit 212 includes a screen depending on the execution result of the processing execution information (such as screen displaying an accessed website thereon), an operation screen for causing the information processing terminal 200 to execute a desired operation, and the like. The display unit 212 includes LCD, organic EL display and the like, for example, but is not limited thereto.

The information processing terminal 200 can execute the processings depending on various instructions transmitted from the information processing apparatus 100 or the processings depending on the processing execution information transmitted from the information processing apparatus 100 with the configuration shown in FIG. 6, for example.

The configuration of the information processing terminal according to the embodiment is not limited to the configuration shown in FIG. 6. For example, the information processing terminal according to the embodiment may further include another communication function other than the first communication path using a carrier wave, capable of communicating with the information processing apparatus according to the embodiment. Another communication function provided in the information processing terminal according to the embodiment includes an infrared communication function for making infrared communication or a communication function for making communication according to the IEEE802.11b, for example, but is not limited thereto.

The information processing system 1000 according to the embodiment includes the information processing apparatus 100 and the information processing terminal 200 both of which are configured as shown in FIG. 6, for example. The information processing apparatus 100 generates the processing execution information based on the static information recorded in the 2-dimensions code C and transmits the generated processing execution information to the information processing terminal 200 through the above processings (1) to (4). Further, the information processing terminal 200 executes the processings depending on various instructions transmitted from the information processing apparatus 100 or the processings depending on the processing execution information transmitted from the information processing apparatus 100. Thus, the processings (a) to (e) described above, for example, are realized in the information processing system 1000.

Specific Examples of Processings in Information Processing System 1000

Specific examples of the processings in the information processing system 1000 will be described below. In the following, the first to fourth examples will be described as the examples of the processings in the information processing system 1000 but the processings in the information processing system 1000 according to the embodiment are not limited to the following examples. For example, the information processing system 1000 can also execute a processing in an arbitrary combination of following examples.

[A] First Example

Figure 9:
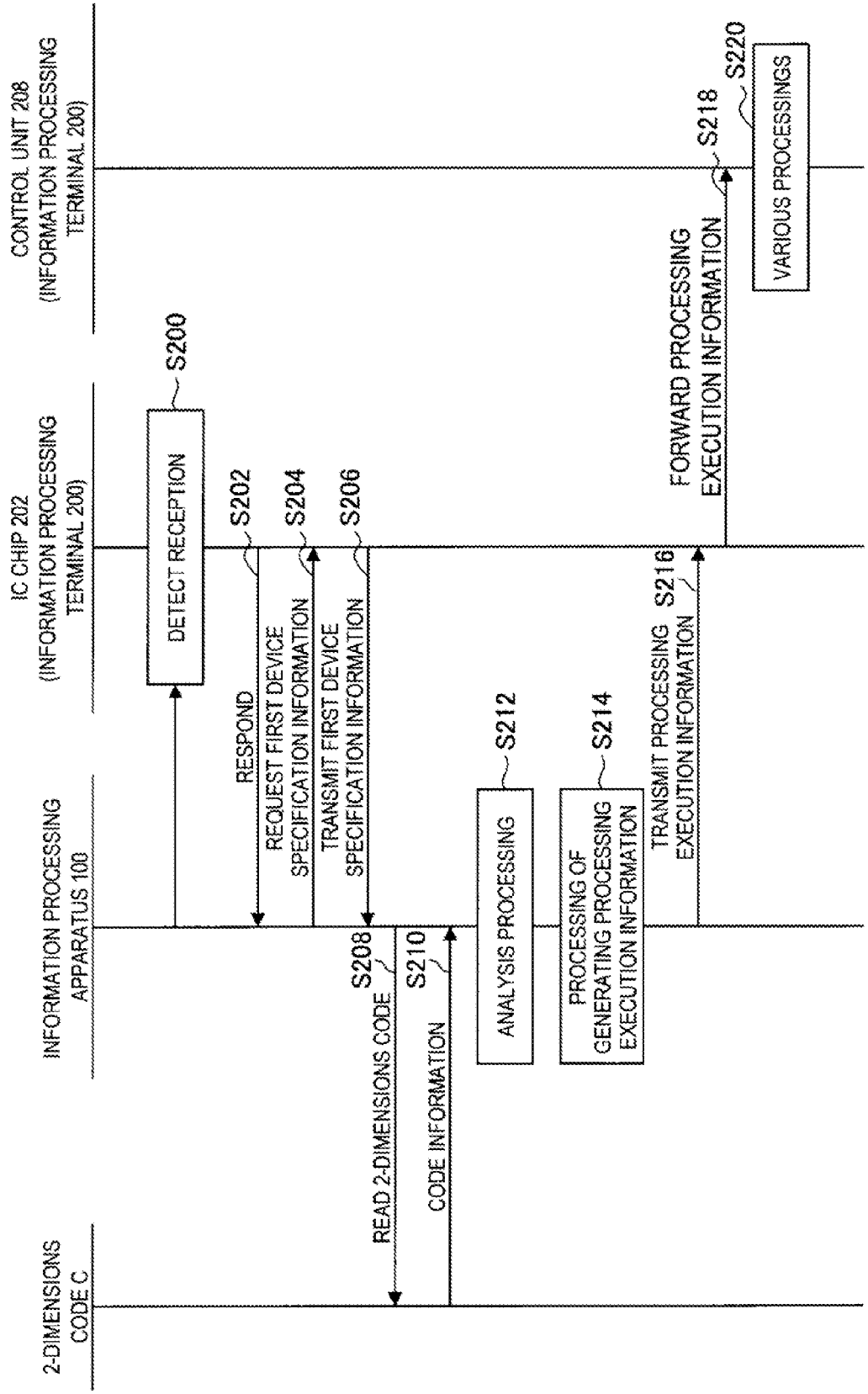
FIG. 9 is an explanatory diagram showing the first example of processings in the information processing system according to the embodiment.

FIG. 9 is an explanatory diagram showing the first example of the processings in the information processing system 1000 according to the embodiment. A processing of detecting the information processing terminal 200 by the information processing apparatus 100 (processing in step S100 of FIG. 5, for example) is omitted from FIG. 9.

The IC chip 202 of the information processing terminal 200 (simply referred to as "IC chip 202" below) detects a reception of a carrier wave periodically/non-periodically or continuously transmitted from the information processing apparatus 100 (S200). Here, the IC chip 202 transmits a detection signal based on an inductive voltage occurring due to electromagnetic induction (or a reception voltage based on oscillated inductive voltage) in the connected communication antenna to the internal control unit 222, for example, thereby executing the processing in step S200.

The IC chip 202 which has detected a reception of a carrier wave in step S200 makes a response indicating that the carrier wave has been received (transmits a response signal) (S202). The IC chip 202 executes load modulation depending on a signal to be transmitted, for example, thereby transmitting a desired signal to the information processing apparatus 100. In the following, the transmission of the response signal from the IC chip 202 to the information processing apparatus 100 through load modulation may be also referred to as "response" simply.

The information processing apparatus 100 which has received the response transmitted from the IC chip 202 in step S202 transmits a first device identifying information acquiring request for causing the IC chip 202 to transmit the first device identifying information (S204).

The IC chip 202 which has received the first device identifying information acquiring request transmitted from the information processing apparatus 100 in step S204 transmits the first device identifying information (S206). The processings in steps S204 and S206 may be contained in the processing in step S200 and the response indicated in S202.

The information processing apparatus 100 which has received the first device identifying information transmitted from the IC chip 202 in step S206 reads the 2-dimensions code C (S208) and acquires the code information from the 2-dimensions code C (S210). The information processing apparatus 100 takes an image of the 2-dimensions code C by the 2-dimensions code read unit 108 to acquire the code information from the 2-dimensions code C.

When the code information is acquired in step S210, the information processing apparatus 100 analyzes the code information (S212; analysis processing). Then, the information processing apparatus 100 generates the processing execution information based on the analysis result in step S212 (S214; processing of generating processing execution information). The information processing apparatus 100 executes the processings in steps S108 to S116 of FIG. 5 based on the analysis result of the code information (corresponding to the analysis result of the 2-dimensions code C), for example, thereby generating the processing execution information.

When the processing execution information is generated in step S214, the information processing apparatus 100 transmits the processing execution information to the IC chip 202 (S216).

The IC chip 202 which has received the processing execution information transmitted from the information processing apparatus 100 in step S216 forwards the received processing execution information to the control unit 208 of the information processing terminal 200 (simply referred to as "control unit 208" below) (S218).

Then, the control unit 208 executes various processings depending on the processing execution information transmitted in step S218 (S220).

In the first example, the processings shown in FIG. 9 are executed in the information processing system 1000, for example. Thus, there is realized the information processing system 1000 in which the information processing apparatus 100 can generate the processing execution information based on the static information recorded in the 2-dimensions code C and transmit the generated processing execution information to the information processing terminal 200.

[B] Second Example

Figure 10:
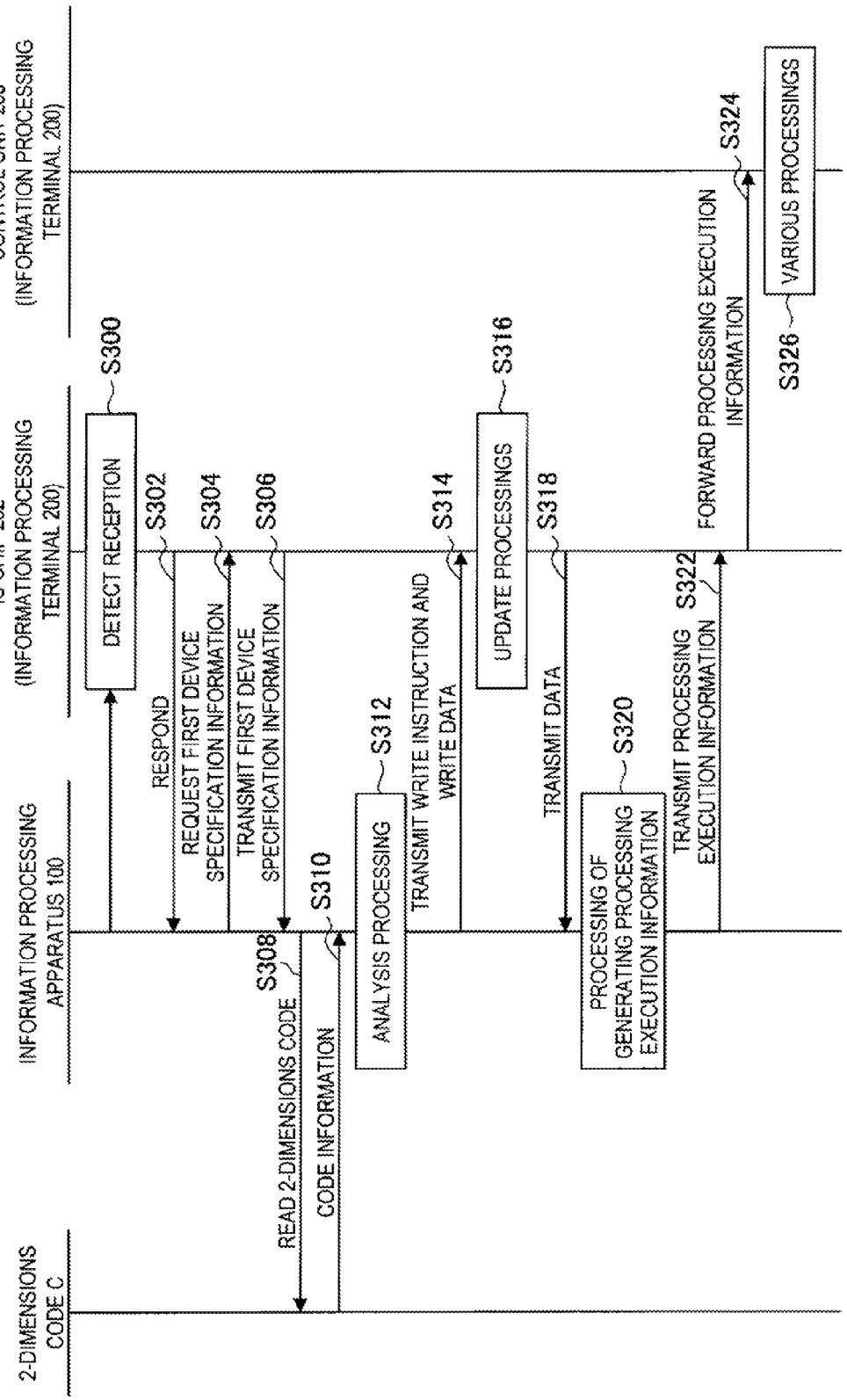
FIG. 10 is an explanatory diagram showing the second example of processings in the information processing system according to the embodiment.

FIG. 10 is an explanatory diagram showing the second example of the processings in the information processing system 1000 according to the embodiment. FIG. 10 shows one example of the processings when the information processing apparatus 100 writes data into the IC chip 202 based on the instruction set in the control information of the 2-dimensions code C. Similarly as in FIG. 9, a processing of detecting the information processing terminal 200 by the information processing apparatus 100 is omitted from FIG. 10.

The IC chip 202-dimensions etects a reception of a carrier wave transmitted periodically/non-periodically or continuously from the information processing apparatus 100 (S300) similarly as in step S200 of FIG. 9. Then, the IC chip 202 makes a response indicating that the carrier wave has been received (S302) similarly as in step S202 of FIG. 9.

The information processing apparatus 100 which has received the response transmitted from the IC chip 202 in step S302 transmits a first device identifying information acquiring request (S304) similarly as in step S204 of FIG. 9. Then, the IC chip 202 which has received the first device identifying information acquiring request transmitted from the information processing apparatus 100 in step S304 transmits the first device identifying information (S306) similarly as in step S206 of FIG. 9. The processings in steps S304 and S306 may be contained in the processing in step S300 and the response indicated in S302 similarly as in steps S204 and S206 of FIG. 9.

The information processing apparatus 100 which has received the first device identifying information transmitted from the IC chip 202 in step S306 reads the 2-dimensions code C (S308) and acquires the code information from the 2-dimensions code C (S310) similarly as in steps S208 and S210 of FIG. 9.

When the code information is acquired in step S310, the information processing apparatus 100 analyzes the code information (S312; analysis processing) similarly as in step S212 of FIG. 9.

The information processing apparatus 100 transmits a write instruction and write data to the IC chip 202 based on the control information and the processing information obtained as a result of the analysis in step S312 (S314).

The IC chip 202 which has received the write instruction and the write data transmitted in step S314 updates data designated by the received write instruction (S316). Then, the IC chip 202 transmits the updated data to the information processing apparatus 100 (S318). The IC chip 202 can also transmit the result of the update processing instead of the updated data in step S318.

The information processing apparatus 100 which has received the data transmitted in step S318 generates the processing execution information based on the analysis result in step S312 (S320; processing of generating processing execution information) similarly as in step S214 of FIG. 9. Then, the information processing apparatus 100 transmits the processing execution information generated in step S320 to the IC chip 202 (S322) similarly as in step S216 of FIG. 9.

The IC chip 202 which has received the processing execution information transmitted from the information processing apparatus 100 in step S322 forwards the received processing execution information to the control unit 208 (S324) similarly as in step S218 of FIG. 9. Then, the control unit 208 executes various processings depending on the processing execution information transmitted in step S324 (S326) similarly as in step S220 of FIG. 9.

In the second example, the processings shown in FIG. 10 are executed in the information processing system 1000, for example. Thus, also in the second example, there is realized the information processing system 1000 in which the information processing apparatus 100 can generate the processing execution information based on the static information recorded in the 2-dimensions code C and transmit the same to the information processing terminal 200.

[C] Third Example

Figure 11:
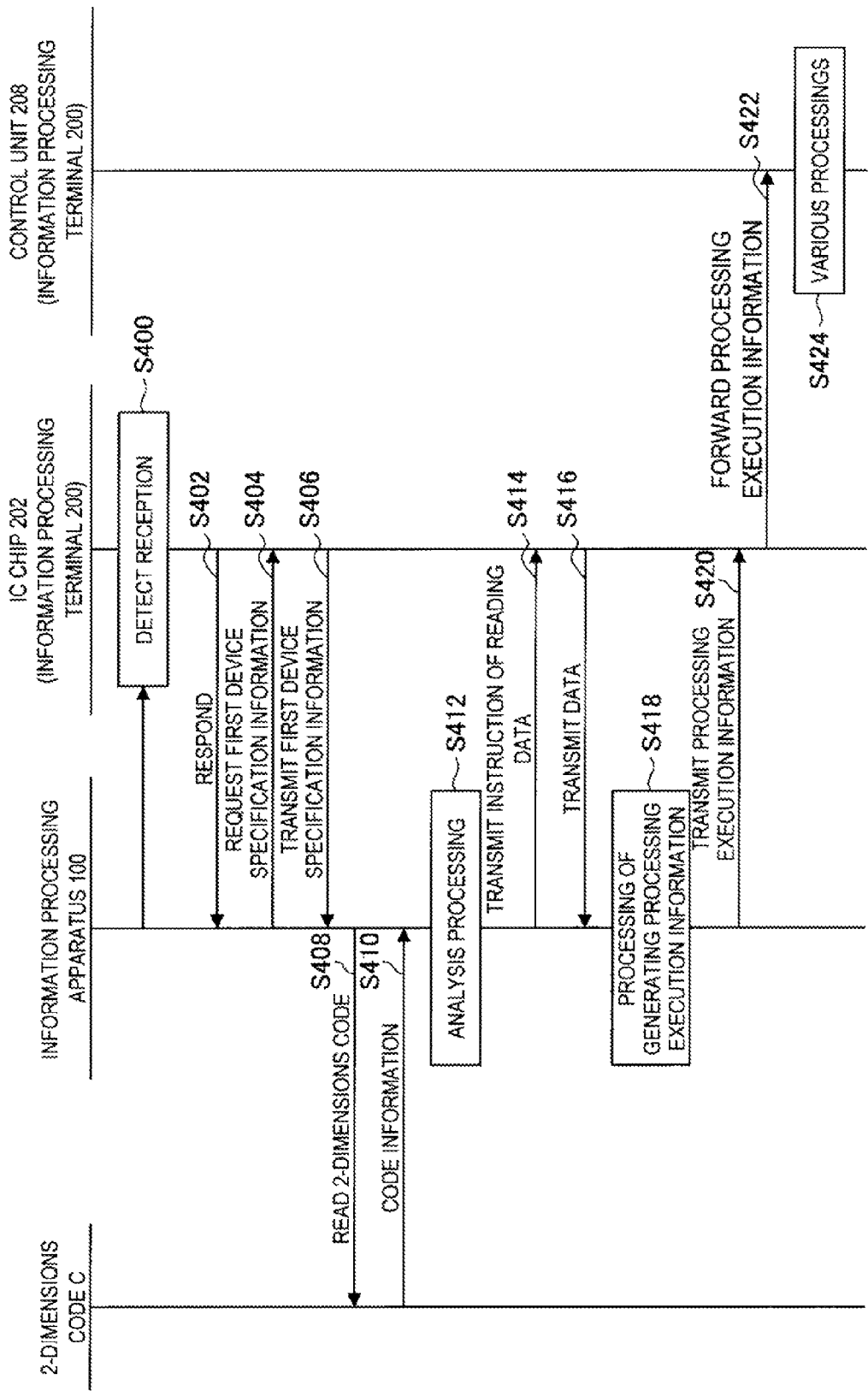
FIG. 11 is an explanatory diagram showing the third example of processings in the information processing system according to the embodiment.

FIG. 11 is an explanatory diagram showing the third example of the processings in the information processing system 1000 according to the embodiment. FIG. 11 shows one example of the processings when the information processing apparatus 100 reads data to the IC chip 202 based on the instruction set in the control information of the 2-dimensions code C. A processing of detecting the information processing terminal 200 by the information processing apparatus 100 is omitted from FIG. 11 similarly as in FIG. 9.

The IC chip 202 detects a reception of a carrier wave transmitted periodically/non-periodically or continuously from the information processing apparatus 100 (S400) similarly as in step S200 of FIG. 9. Then, the IC chip 202 makes a response indicating that the carrier wave has been received (S402) similarly as in step S202 of FIG. 9.

The information processing apparatus 100 which has received the response transmitted from the IC chip 202 in step S402 transmits a first device identifying information acquiring request (S404) similarly as in step S204 of FIG. 9. Then, the IC chip 202 which has received the first device identifying information acquiring request transmitted from the information processing apparatus 100 in step S404 transmits the first device identifying information (S406) similarly as in step S206 of FIG. 9. The processings in steps S404 and S406 may be contained in the processing in step S400 and the response indicated in S402 similarly as in steps S204 and S206 of FIG. 9.

The information processing apparatus 100 which has received the first device identifying information transmitted from the IC chip 202 in step S406 reads the 2-dimensions code C (S408) and acquires the code information from the 2-dimensions code C (S410) similarly as in steps S208 and S210 of FIG. 9.

When the code information is acquired in step S410, the information processing apparatus 100 analyzes the code information (S412; analysis processing) similarly as in step S212 of FIG. 9.

The information processing apparatus 100 transmits a data reading instruction of reading predetermined data from the IC chip 202 based on the control information obtained as a result of the analysis in step S412 (S414).

The IC chip 202 which has received the data reading instruction transmitted in step S414 reads the data designated by the received data reading instruction and transmits the read data to the information processing apparatus 100 (S416).

The information processing apparatus 100 which has received the data transmitted in step S416 generates the processing execution information based on the analysis result in step S412 (S418; processing of generating processing execution information) similarly as in step S214 of FIG. 9. Then, the information processing apparatus 100 transmits the processing execution information generated in step S418 to the IC chip 202 (S420) similarly as in step S216 of FIG. 9.

The IC chip 202 which has received the processing execution information transmitted from the information processing apparatus 100 in step S420 forwards the received processing execution information to the control unit 208 (S422) similarly as in step S218 of FIG. 9. Then, the control unit 208 executes various processings depending on the processing execution information transmitted in step S422 (S424) similarly as in step S220 of FIG. 9.

In the third example, the processings shown in FIG. 11 are executed in the information processing system 1000, for example. Thus, also in the third example, there is realized the information processing system 1000 in which the information processing apparatus 100 can generate the processing execution information based on the static information recorded in the 2-dimensions code C and transmit the same to the information processing terminal 200.

[D] Fourth Example

FIG. 12 is an explanatory diagram showing the fourth example of the processings in the information processing system 1000 according to the embodiment. FIG. 12 shows one example of the processings when the information processing apparatus 100 (strictly, an information processing apparatus according to a variant) and the information processing terminal 200 (strictly, an information processing terminal according to a variant) communicate with each other via a communication function other than the first communication path using a carrier wave. A processing of detecting the information processing terminal 200 by the information processing apparatus 100 is omitted from FIG. 12 similarly as in FIG. 9.

The IC chip 202 detects a reception of a carrier wave transmitted periodically/non-periodically or continuously from the information processing apparatus 100 (S500) similarly as in step S200 of FIG. 9. Then, the IC chip 202 makes a response indicating that the carrier wave has been received (S502) similarly as in step S202 of FIG. 9.

The information processing apparatus 100 which has received the response transmitted from the IC chip 202 in step S502 transmits a first device identifying information acquiring request (S504) similarly as in step S204 of FIG. 9. Then, the IC chip 202 which has received the first device identifying information acquiring request transmitted from the information processing apparatus 100 in step S504 transmits the first device identifying information (S506) similarly as in step S206 of FIG. 9. The processings in steps S504 and S506 may be contained in the processing in step S500 and the response indicated in S502 similarly as in steps S204 and S206 of FIG. 9.

The information processing apparatus 100 which has received the first device identifying information transmitted from the IC chip 202 in step S506 reads the 2-dimensions code C (S508) and acquires the code information from the 2-dimensions code C (S510) similarly as in steps S208 and S210 of FIG. 9.

When the code information is acquired in step S510, the information processing apparatus 100 analyzes the code information (S512; analysis processing) similarly as in step S212 of FIG. 9. Then, the information processing apparatus 100 generates the processing execution information based on the analysis result in step S512 (S514; processing of generating processing execution information) similarly as in step S212 of FIG. 9.

When the processing execution information is generated in step S514, the information processing apparatus 100 transmits the processing execution information to the IC chip 202 (S516) similarly as in step S216 of FIG. 9.

The IC chip 202 which has received the processing execution information transmitted from the information processing apparatus 100 in step S516 forwards the received processing execution information to the control unit 208 (S518) similarly as in step S218 of FIG. 9.

The control unit 208 to which the processing execution information has been transmitted in step S518 uses another communication function other than the communication function using the first communication path of the IC chip 202 to transmit a data acquiring request to the information processing apparatus 100 based on the instruction recorded in the processing execution information (S520). In the following, the communication using another communication function is represented as communication between the control unit 208 and the information processing apparatus 100. Though not shown in FIG. 12, when communication for establishing communication such as authentication for the information processing apparatus 100 is required in the communication using another communication function, the communication is made between the control unit 208 and the information processing apparatus 100, for example. Further, the communication control unit 208 can communicate with the information processing apparatus 100 in the communication via the first communication path using a protocol for device communication, for example.

The information processing apparatus 100 which has received the data acquiring request transmitted from the control unit 208 in step S520 transmits the data requested by the data acquiring request (data obtained from the 2-dimensions code C through the processings in steps S508 to S512) to the control unit 208 (S522).

The control unit 208 which has received the data transmitted from the information processing apparatus 100 in step S522 uses the received data to execute various processings depending on the processing execution information transmitted in step S518 (S524).

In the fourth example, the processings shown in FIG. 12 are executed in the information processing system 1000, for example. Thus, also in the fourth example, there is realized the information processing system 1000 in which the information processing apparatus 100 can generates the processing execution information based on the static information recorded in the 2-dimensions code C and transmit the same to the information processing terminal 200.

As described above, the information processing system 1000 according to the embodiment includes the information processing apparatus 100 and the information processing terminal 200. The information processing apparatus 100 reads the 2-dimensions code C, generates the processing execution information based on the static information recorded in the 2-dimensions code C and transmits the generated processing execution information to the information processing terminal 200. More specifically, the information processing apparatus 100 executes the processing (1) (processing of detecting the information processing terminal 200), the processing (2) (processing of acquiring the first device identifying information), the processing (3) (processing of generating the processing execution information) and the processing (4) (processing of transmitting the processing execution information) described above, for example. Thus, there is realized the information processing system 1000 in which the information processing apparatus 100 can generate the information for defining the processings to be executed by the information processing terminal 200 based on the static information recorded in the 2-dimensions code and transmit the generated information to the information processing terminal 200.

Further, the information processing terminal 200 executes the processings depending on the processing execution information based on the processing execution information generated by and transmitted from the information processing apparatus 100. Thus, the information processing system 1000 is employed so that more general services can be realized, including the processings difficult to realize in the related art (such as the above processings (a) to (d)) as shown in the processings (a) to (e), for example. In the information processing system 1000, the information processing apparatus 100 can dynamically generate the processing execution information based on the control information recorded in the 2-dimensions code C. In other words, if the information (data) recorded in the 2-dimensions code C is changed, the information processing apparatus 100 can generate the processing execution information based on the changing. Thus, the information (data) can be changed by changing the 2-dimensions code in the information processing system 1000 similarly as in the related art, which can be realized at the same cost as in the related art. Thus, in the information processing system 1000 according to the embodiment, the information can be dynamically transmitted from the 2-dimensions code C to the information processing terminal 200, which is difficult to realize in the related art, without largely increasing the cost as compared with the related art.

Further, the user of the information processing terminal 200 holds the information processing terminal 200 over the information processing apparatus 100 so that the information processing terminal 200 can acquire the processing execution information based on the information recorded in the 2-dimensions code C. In other words, the user of the information processing terminal 200 does not need to execute a predetermined operation for taking an image of the 2-dimensions code unlike when using the information processing terminal to which the related art is applied. Thus, the information processing system 1000 can further improve the user's convenience than in the information processing system using the related art.

There has been described above the information processing apparatus 100 as a constituent configuring the information processing system 1000 according to the embodiment, but the embodiment is not limited thereto. The embodiment can be applied to various devices having a function capable of reading a 2-dimensions code and a reader/writer function (that is, function of mainly transmitting a carrier wave), for example.

Furthermore, there has been described the information processing terminal 200 as a constituent configuring the information processing system 1000 according to the embodiment, but the embodiment is not limited thereto. The embodiment can be applied to various devices such as portable communication devices including cell phone or PHS (Personal Handy System), video/music playback devices including WALK MAN (registered trademark), portable game players including Play Station Portable (registered trademark), and computers including PDA (Personal Digital Assistant) and notebook-type PC.

Program for Information Processing Apparatus According to an Embodiment

A program for causing a computer to function as the information processing apparatus 100 according to the embodiment of the present invention enables to generate information (processing execution information) for defining the processings to be executed by the information processing terminal based on the static information recorded in the 2-dimensions code and to transmit the generated information (processing execution information) to the information processing terminal.

There has been described above the configuration in which the information processing apparatus 100 according to the embodiment generates the processing execution information based on the static information recorded in the 2-dimensions code, but the configuration is not limited thereto. For example, the information processing apparatus according to the embodiment reads one, or two or more barcodes recording information therein, thereby generating the processing execution information based on the static information recorded in the barcodes. Further, the information processing apparatus according to the embodiment takes an image of a recording medium recording information therein by other system and executes image analysis, thereby generating the processing execution information based on the static information recorded in the recording medium. Even in the above case, the information processing apparatus according to the embodiment can generate the processing execution information based on the analysis result of the read information and transmit the same to the information processing terminal according to the embodiment. Thus, the information processing system having the information processing apparatus according to the above variant can obtain similar effects as those in the information processing system 1000 described above.

Furthermore, for example, there has been described that the program (computer program) for causing the computer to function as the information processing apparatus according to the embodiment of the present invention is provided, but the embodiment can provide a storage medium storing the program therein together.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a communication unit for transmitting a carrier wave having a predetermined frequency, and making noncontact communication with an information processing terminal;
a 2-dimensional code reader unit for reading a 2-dimensional code recording therein processing information on processings to be executed by the information processing terminal;
a 2-dimensional code analysis unit for analyzing the 2-dimensional code read in the 2-dimensional code reader unit and acquiring the processing information from the 2-dimensional code; and
a processing unit for generating processing execution information for causing the information processing terminal to execute a predetermined processing based on an analysis result by the 2-dimensional code analysis unit, and causing the communication unit to transmit the processing execution information to the information processing terminal,
wherein the 2-dimensional code further records therein control information in which conditions for the processings in the processing unit are set, and
the processing unit selectively executes a processing that meets a condition based on the conditions set in the control information acquired by the 2-dimensional code analysis unit from the 2-dimensional code.

2. The information processing apparatus according to claim 1, wherein the processing unit generates processing execution information containing the processing information and first device identifying information for uniquely specifying the information processing terminal acquired from the information processing terminal, or processing execution information containing the processing information and second device identifying information for specifying the information processing apparatus.

3. The information processing apparatus according to claim 2, wherein the processing execution information generated by the processing unit includes acquisition data acquired from the information processing terminal.

4. The information processing apparatus according to claim 3, wherein the processing unit generates processing execution information containing the processing information, the first device identifying information, the acquisition data and the second device identifying information.

5. An information processing method comprising:
reading a 2-dimensional code recording therein processing information on processings to be executed by an information processing terminal capable of making noncontact communication via a communication path using a carrier wave having a predetermined frequency, wherein the 2-dimensional code further records therein control information in which conditions for the processings are set;
analyzing the 2-dimensional code read in the reading step and acquiring the processing information from the 2-dimensional code;
generating processing execution information for causing the information processing terminal to execute a predetermined processing based on an analysis result in the acquiring step;
transmitting the processing execution information generated in the generating step to the information processing terminal via a communication unit for transmitting the carrier wave having a predetermined frequency to communicate with the information processing terminal;
selectively executing a processing that meets a condition based on the conditions set in the control information acquired from the 2-dimensional code.

6. A computer program product stored on a non-transitory computer-readable medium that when executed by a processor performs steps for:
reading a 2-dimensional code recording therein processing information on processings to be executed by an information processing terminal capable of making noncontact communication via a communication path using a carrier wave having a predetermined frequency, wherein the 2-dimensional code further records therein control information in which conditions for the processings are set;

analyzing the 2-dimensional code read in the reading step and acquiring the processing information from the 2-dimensional code;

generating processing execution information for causing the information processing terminal to execute a predetermined processing based on an analysis result in the acquiring step;

transmitting the processing execution information generated in the generating step to the information processing terminal via a communication unit for transmitting the carrier wave having a predetermined frequency to communicate with the information processing terminal; and selectively executing a processing that meets a condition based on the conditions set in the control information acquired from the 2-dimensional code.

7. An information processing system comprising an information processing apparatus and an information processing terminal capable of making noncontact communication with the information processing apparatus via a communication path using a carrier wave having a predetermined frequency, wherein the information processing apparatus includes a communication unit for transmitting the carrier wave having a predetermined frequency, and making noncontact communication with the information processing terminal, a 2-dimensional code reader unit for reading a 2-dimensional code recording therein processing information on processings to be executed by the information processing terminal, a 2-dimensional code analysis unit for analyzing the 2-dimensional code read in the 2-dimensional code reader unit and acquiring the processing information from the 2-dimensional code, and a processing unit for generating processing execution information for causing the information processing terminal to execute a predetermined processing based on an analysis result by the 2-dimensional code analysis unit and causing the communication unit to transmit the processing execution information to the information processing terminal, wherein the 2-dimensional code further records therein control information in which conditions for the processings in the processing unit are set, and the processing unit selectively executes a processing that meets a condition based on the conditions set in the control information acquired by the 2-dimensional code analysis unit from the 2-dimensional code, and wherein the information processing terminal includes a terminal side communication unit for making noncontact communication with the information processing apparatus via the communication path using a carrier wave, and a control unit for executing a processing based on the processing execution information received by the terminal side communication unit.

8. An information processing apparatus comprising:

a communication unit for transmitting a carrier wave having a predetermined frequency, and making noncontact communication with an information processing terminal;

a 2-dimensional code reader unit for reading a 2-dimensional code recording therein processing information on processings to be executed by the information processing terminal;

a 2-dimensional code analysis unit for analyzing the 2-dimensional code read in the 2-dimensional code reader unit and acquiring the processing information from the 2-dimensional code;

a processing unit for generating processing execution information for causing the information processing terminal to execute a predetermined processing based on an analysis result by the 2-dimensional code analysis unit, and causing the communication unit to transmit the processing execution information to the information processing terminal; and a detection unit for detecting the information processing terminal, wherein the 2-dimensional code reader unit reads the 2-dimensional code when the information processing terminal is detected based on a detection result by the detection unit, and does not read the 2-dimensional code when the information processing terminal is not detected based on a detection result by the detection unit.

9. The information processing terminal according to claim 8, wherein the communication unit transmits the carrier wave when the information processing terminal is detected based on a detection result by the detection unit, and does not transmit the carrier wave when the information processing terminal is not detected based on a detection result by the detection unit.

* * * * *